Nov. 13, 1945.   L. W. BATES   2,388,708
PIN SETTING MECHANISM FOR BOWLING ALLEYS
Filed March 19, 1940    10 Sheets-Sheet 1

INVENTORS
LEON W. BATES
BY
Albert Sperry
ATTORNEY

Nov. 13, 1945.　　　L. W. BATES　　　2,388,708
PIN SETTING MECHANISM FOR BOWLING ALLEYS
Filed March 19, 1940　　　10 Sheets-Sheet 4
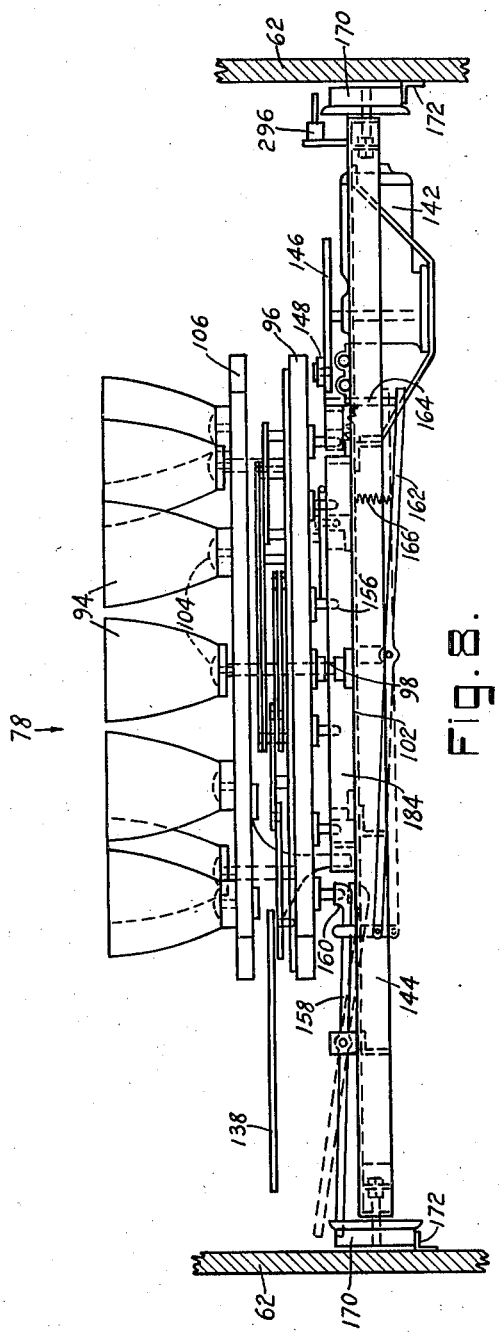
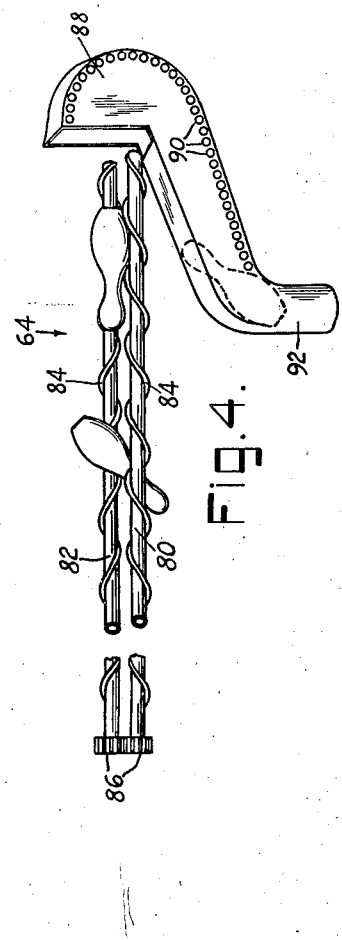
INVENTORS
LEON W. BATES
BY
Albert Sperry.
ATTORNEY

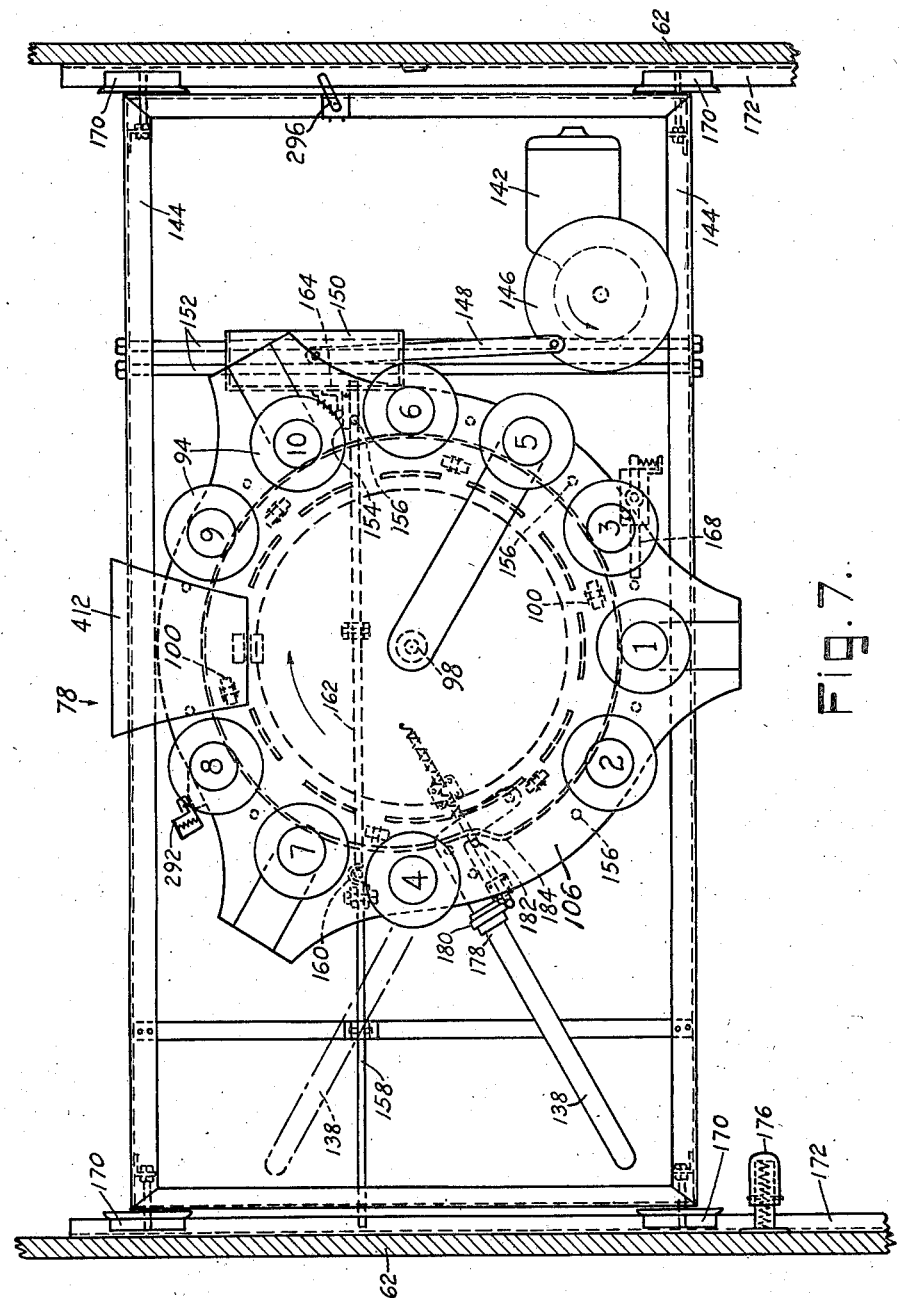

Nov. 13, 1945.  L. W. BATES  2,388,708
PIN SETTING MECHANISM FOR BOWLING ALLEYS
Filed March 19, 1940   10 Sheets-Sheet 7
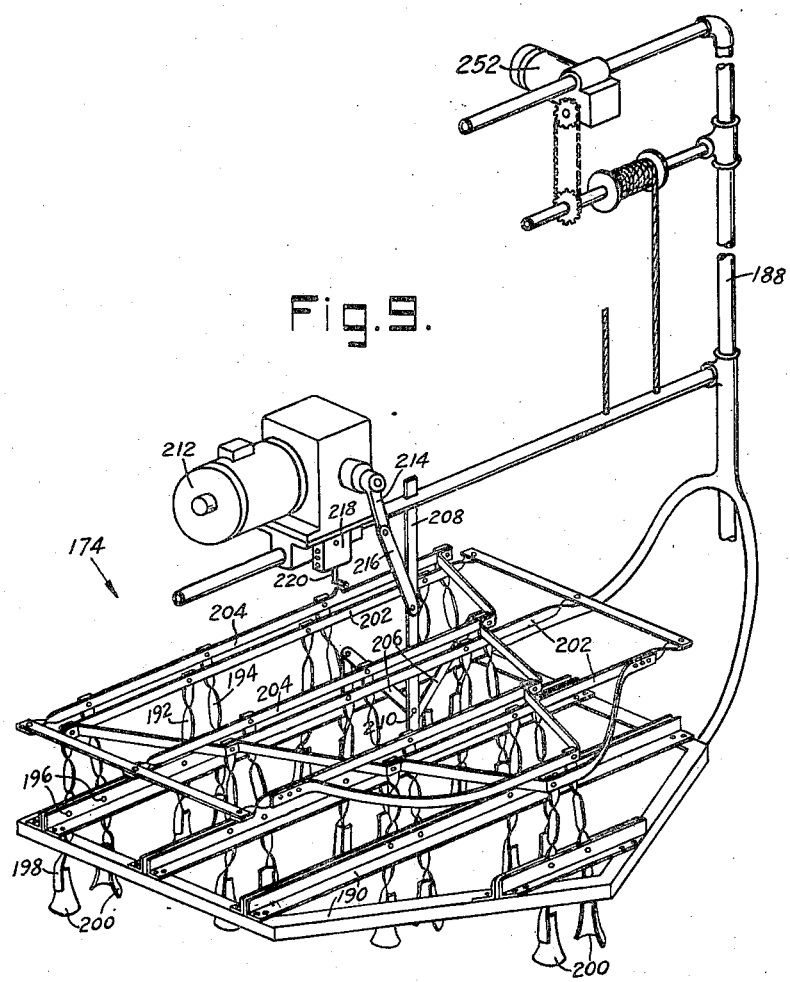
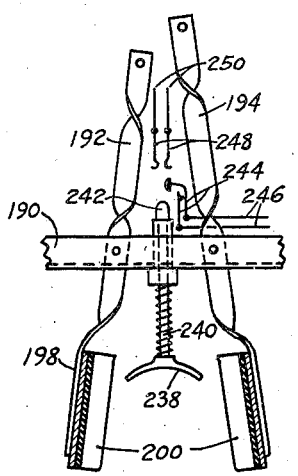
INVENTORS
*LEON W. BATES*
BY *Albert Sperry*
ATTORNEY Nov. 13, 1945.  L. W. BATES  2,388,708

PIN SETTING MECHANISM FOR BOWLING ALLEYS

Filed March 19, 1940  10 Sheets-Sheet 9

READY

AFTER 1ST. BALL

SPOTTER LIFTING STANDING PINS

SPOTTER UP FOR SWEEP

PINS RE-SET, COLLECTOR FORW'D

AFTER 2ND. BALL

READY FOR NEXT FRAME

INVENTORS
LEON W. BATES
BY  *Albert Sperry.*
ATTORNEY

Nov. 13, 1945.   L. W. BATES   2,388,708
PIN SETTING MECHANISM FOR BOWLING ALLEYS
Filed March 19, 1940   10 Sheets-Sheet 10

INVENTORS
LEON W. BATES
BY
Albert Sperry
ATTORNEY

Patented Nov. 13, 1945

2,388,708

UNITED STATES PATENT OFFICE 2,388,708

PIN SETTING MECHANISM FOR BOWLING ALLEYS

Leon W. Bates, Trenton, N. J., assignor to American Machine and Foundry Company, a corporation of New Jersey Application March 19, 1940, Serial No. 324,762

59 Claims. (Cl. 273—43)

This invention relates to mechanism for use in combination with a bowling alley or with other similar ball and pin games or devices and particularly to mechanism for automatically resetting the pins and returning the balls to the player.

Devices which have been designed for this purpose heretofore have in most every instance required the use of special constructions of the alley or of the pins or both and have not been applicable directly to existing alleys or adapted for use with conventional pins approved by the American Bowling Congress. Moreover, devices of this type as heretofore designed have been exceedingly complicated and expensive to construct and operate and have not been so designed as to insure proper operation of the mechanism over long periods of time and under all conditions of use.

In accordance with the present invention these objections to constructions of the prior art are overcome and mechanism provided which is relatively simple and inexpensive to produce and operate and which is adapted for application directly to existing bowling alleys without making any change in the floor of the alley and without using any special pins. Devices embodying the present invention are therefore capable of being installed without relaying the alley and without discarding conventional pins and equipment employed in bowling alleys today.

While the invention is adapted for use with various types and styles of ball and pin games and equipment, it is particularly applicable to conventional bowling alleys of the type having a floor or playing surface provided with a pit at the end of the alley into which the balls and pins pass in the course of the game.

In that form of the invention illustrated in the drawings the mechanism embodies a conveyor which is located in the pit and serves to deliver the balls to a ball return device and serves to deliver the pins to an elevator. The elevator raises the pins from the pit and discharges them onto a butt feed device which inverts the pins where necessary so that they travel butt foremost to a pin collector. The pin collector receives the pins and cooperates with a spotter having gripping members to arrange the pins and lower them into position on the playing surface of the alley. The mechanism also includes a sweep for removing fallen pins from the alley and is actuated after the first ball to remove "dead wood" and again actuated after the second ball is rolled to remove all of the pins from the alley so that a new set of pins may be placed in position without delay.

The operation of the mechanism preferably is controlled by electrical means responsive to movement of the playing balls so that the device is completely automatic and requires no manual operation whatever. The control means may be actuated manually by coin operated means or otherwise to permit play to be started.

Each of the various elements of the combination is itself capable of change and modification and certain of the devices embodied therein may be used independently of others or by themselves or they may be replaced by other equivalent mechanism. However, the mechanism in its preferred form includes means for controlling and coordinating the operation of such devices and for purposes of illustration the invention is shown in the drawings as including a preferred combination of elements which has been found in practice to be practical and serviceable.

One of the objects of the present invention is to provide a bowling alley or other ball and pin device with novel means for resetting the pins in predetermined positions.

Another object of the invention is to provide novel means for separating the balls and pins and for delivering each to other means for handling the same.

Another object of the invention is to provide novel means for raising the pins from the pit at the end of a bowling alley.

A further object of the invention is to provide novel means for inverting pins so that they travel butt end foremost in the mechanism.

Another object of the invention is to provide novel means for collecting and arranging bowling pins preparatory to placing the same on the playing surface of an alley.

Another object of the invention is to provide pin setting mechanism adapted to be applied to conventional bowling alleys without relaying the floor of the alley.

A further object of the invention is to provide pin setting means for bowling alleys and the like adapted for operation with conventional wooden pins of the type in current use today.

These and other objects and features of our invention will appear from the following description thereof in which reference is made to the accompanying figures of the drawings.

In the drawings:

Fig. 4 is a perspective of a portion of the mechanism showing the butt feed device.

Fig. 7 is a plan view showing the arrangement of the collector on its carriage.

Fig. 8 is a front elevation of the collector shown in Fig. 7.

Fig. 9 is a perspective showing the spotting device and driving means therefor.

Fig. 10 is an enlarged view of one of the pairs of gripping members of the spotting device.

Figure 1:
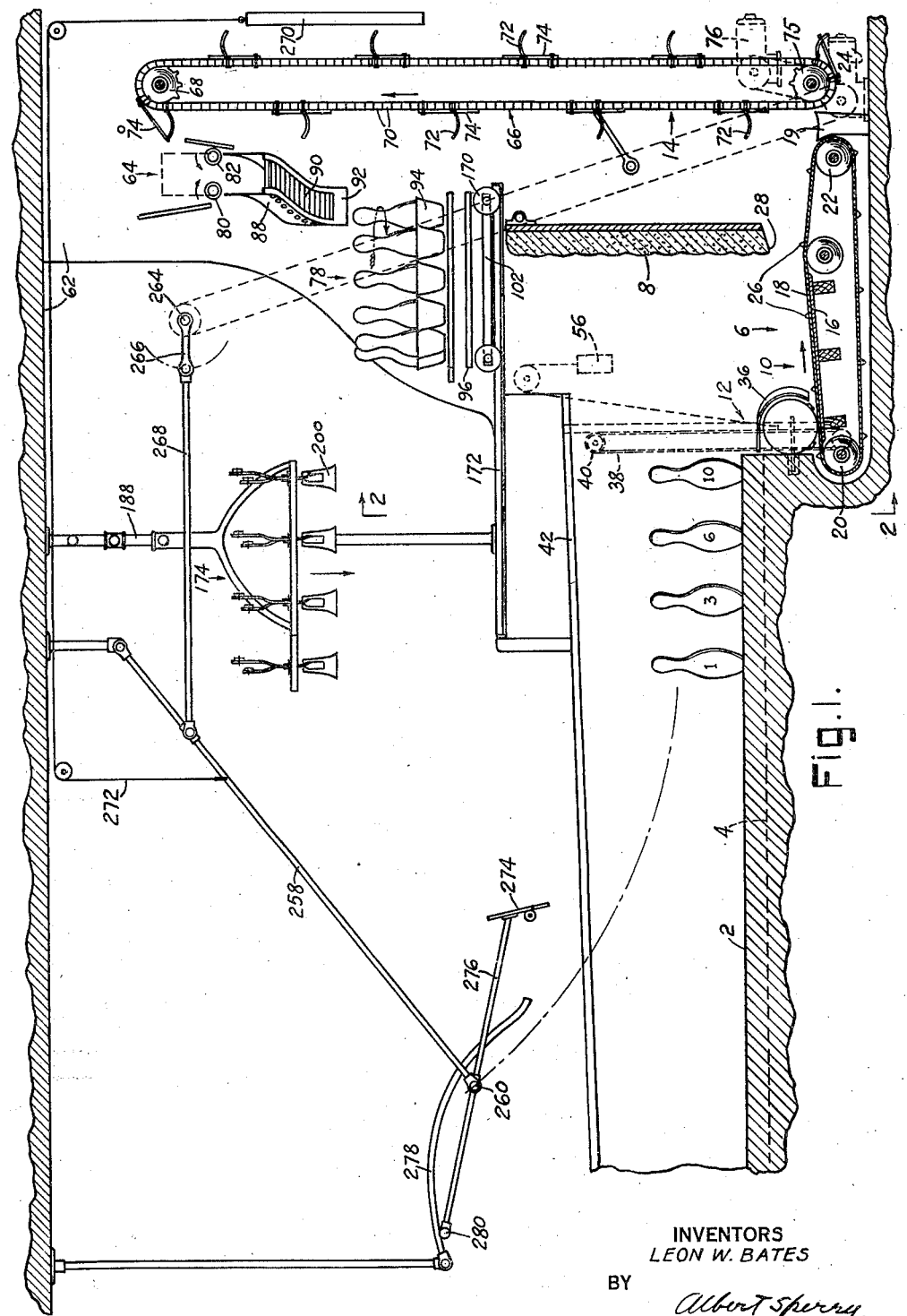
Fig. 1 is a vertical sectional view of a typical embodiment of the invention as applied to a conventional bowling alley.

The construction shown in the drawings is applied to a bowling alley having a playing surface 2 with gutters 4 at the sides thereof and a pit 6 at the end of the alley. A back stop 8 is spaced from the end of the alley as in standard bowling alley constructions.

The pit conveyor

Within the pit 6 and below the back stop is located a conveyor 10 for separating the pins from the balls and for conveying the balls to a ball return device 12 and conveying the pins to an elevator 14 for raising the pins from the pit so that they can be reset on the playing surface of the alley.

Figure 2:
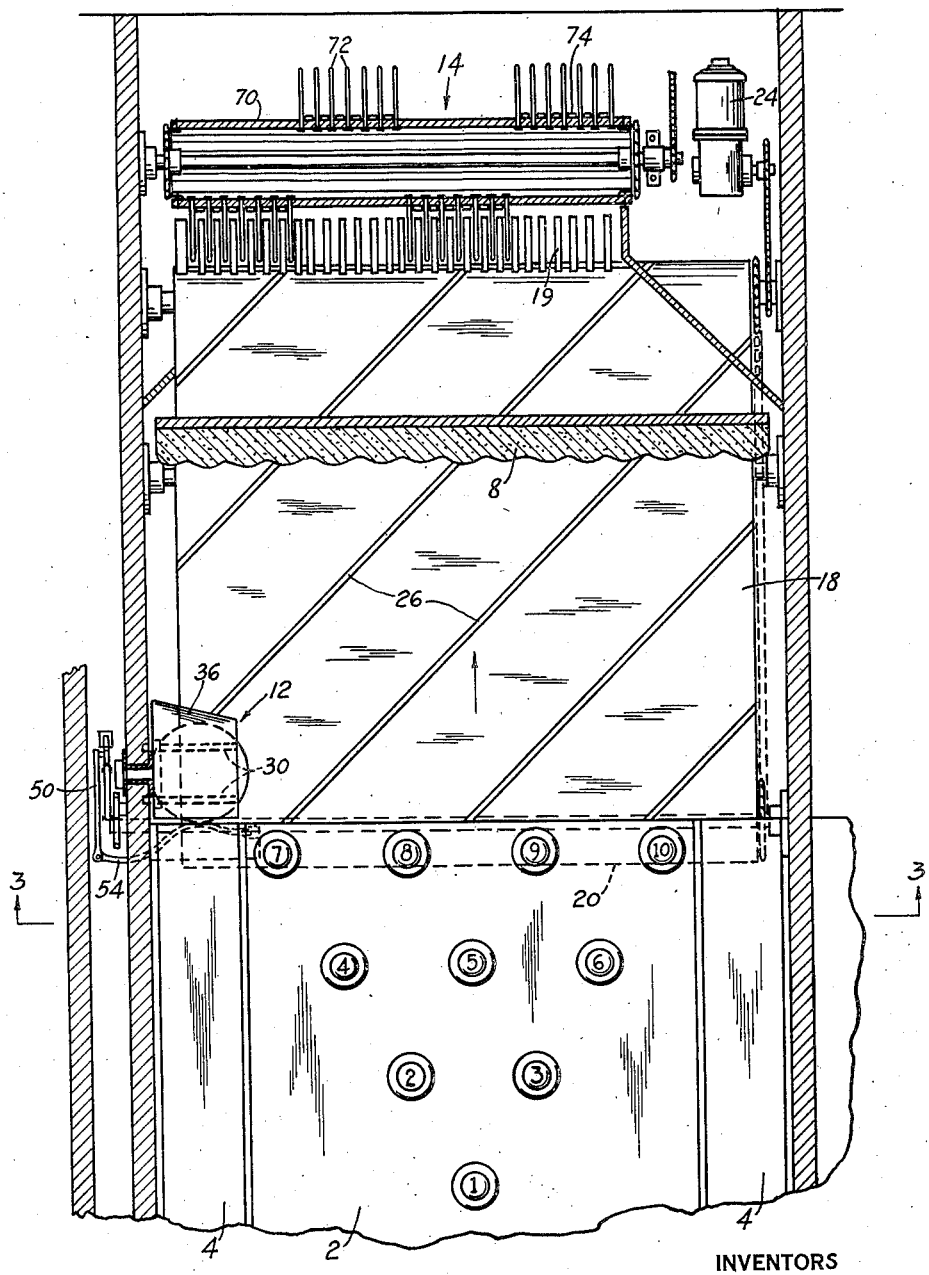
Fig. 2 is a horizontal sectional view of the mechanism illustrated in Fig. 1 taken on the line 2—2 thereof.
Figure 3:
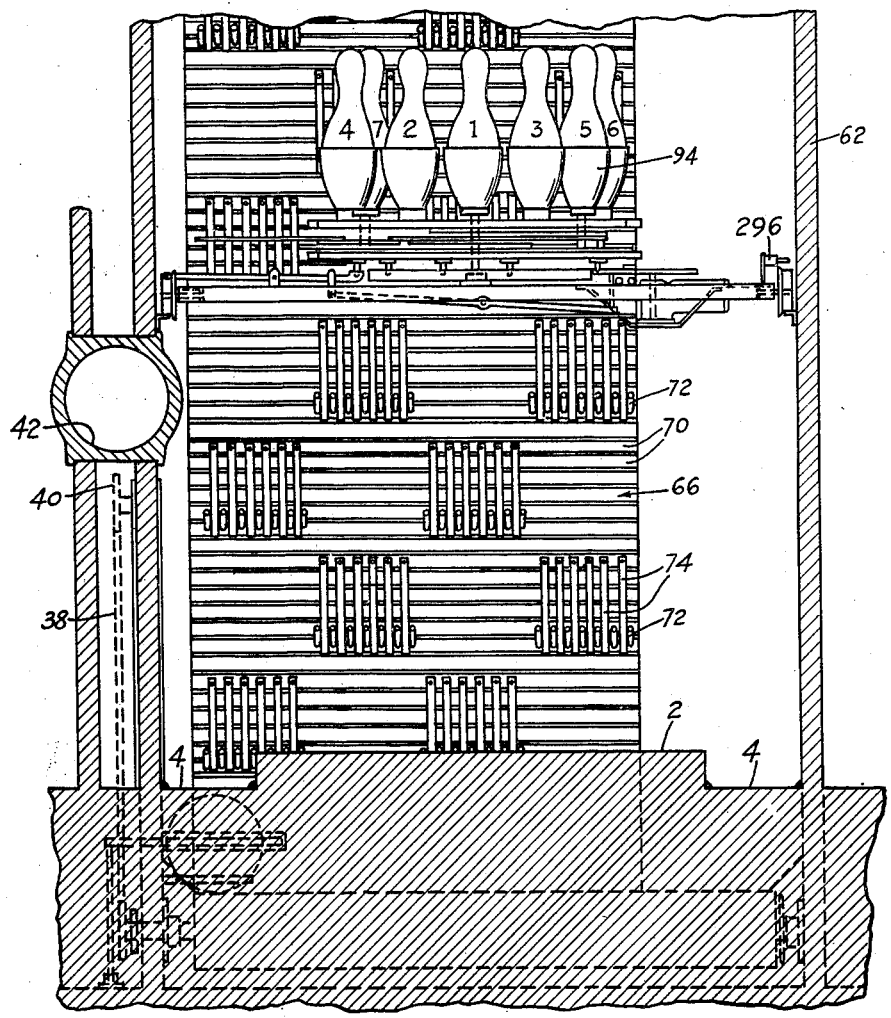
Fig. 3 is a vertical sectional view of the mechanism of Fig. 1 taken on the line 3—3 of Fig. 2.

The conveyor is formed with a base 16 having an upper inclined surface over which a conveyor belt 18 is moved in the direction of the arrow in Fig. 2 beneath the back stop 8. The rear portion of the base is inclined toward a channel 19 adjacent the elevator 14. The belt 18 passes about an idler roll 20 at the front of the pit, a second idler roll directly under the back stop and over a rear driving roll 22 which is driven continuously by a motor 24.

The upper face of the belt 18 is formed with diagonally extending projections or ribs 26 which serve to move the balls to the left as seen in Fig. 2 to the ball return device 12 and serve to carry the pins rearwardly beneath the back stop 8 to the elevator 14. The forwardly inclined upper surface of the base 16 over which the conveyor belt travels and the transversely inclined diagonal ribs 26 on the belt cooperate to cause the balls to move toward the ball return, as they roll forward and downward on the rearwardly moving belt. The lower edge 28 of the back stop is spaced from the belt 18 a distance great enough to permit the pins to pass rearwardly beneath the back stop to the elevator but prevents the balls from being carried along with the pins.

The position and arrangement of the ribs on the belt, the inclination of the support over which the belt moves and the speed of operation thereof as well as the space provided between the back stop and belt may be varied to adapt the invention for use with "regulation" pins, "duck" pins, "candle" pins or other pins or members which the device is employed to handle.

The ball return device

Figure 20:
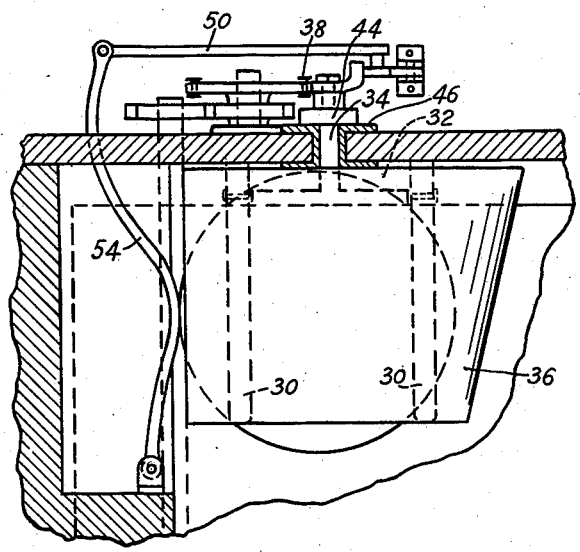
Fig. 20 is a horizontal sectional view of the sectional view of the construction illustrated in Fig. 19.
Figure 19:
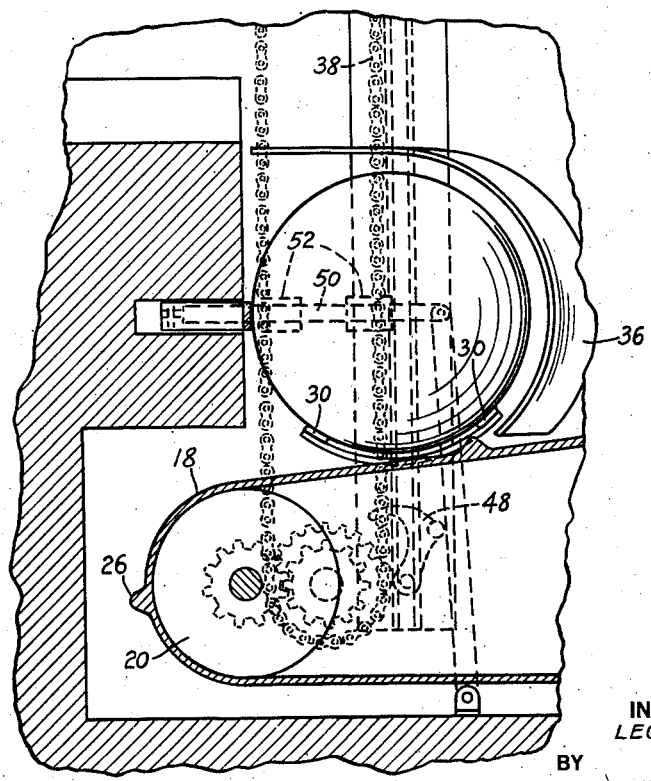
Fig. 19 is a vertical sectional view of a typical ball return device.

The ball return device to which the pit conveyor delivers the balls may be of any suitable type or construction. The form thereof shown in Figs. 19 and 20 embodies a ball lifting fork 30 secured to a block 32 having a rear bearing portion extending through a vertical slot 34 in the "kick-back" at the side of the pit. A hood 36 is fastened to the block 32 within the pit and formed with a laterally open side to admit balls to the lifting fork and with a closed rear face which prevents pins falling into the pit from rolling onto the lifting fork or otherwise interfering with the operation of the ball return device.

The lifting fork is raised by means of a chain 38 located behind the "kick-back" and extending upward over a sprocket 40 adjacent the inclined ball return track 42. The chain is driven continuously from the pit conveyor motor 24 by suitable means. The fork carrying block 32 is provided with a bearing block 44 which bears against plates 46 on the outer face of the "kick-back" on opposite sides of the slot 34. A hook 48 carried by the bearing block 44 is movable to engage the links of the chain 38 by means of an actuating member 50 slidable in brackets 52 and connected at its end to a pivoted ball contact lever 54.

With this construction the ball in entering the hood 36 passes onto the lifting fork 30 and at the same time engages ball contact lever 54. In this way the actuating member 50 moves hook 48 into engagement with one of the links of the continuously driven chain 38 causing the chain to raise the bearing block 44 and the connected fork carrying block 32. The ball and hood are thus raised together above the ball return track 42 whereupon the ball rolls off onto the track and is returned to the player. Thereafter the teeth of the sprocket 40 engage the hook 48 to push it out of engagement with the links of the chain 38 so that the lifting fork and hood descend by gravity raising a counter-weight 66 which insures smooth return thereof.

The operation of ball contact lever 54 also serves to close a starting switch 58 which initiates operation of other devices in the mechanism whereas the bearing block 44 as it raises and nears its upper position actuates a second switch 60 to rotate it through an arc of 90 degrees to close one of the contacts 61 and 62 for preparing the mechanism for operation in response to a second ball as described hereafter in connection with the automatic control of the system.

The elevator

The elevator employed for raising the pins from the pit is supported by a frame work 62 and extends above the butt feed device 64 located adjacent the upper portion of the framework. The elevator shown is in the form of a vertically extending belt 66 located behind the back stop and passing over a roll 68 positioned above the butt feed screws 64. The belt is provided with transversely extending slats 70 from which project pin carriers 72 in the form of spaced curved fingers adapted to receive and hold the pins to raise them from the pit as the belt travels upward. The carriers 72 are arranged in spaced groups which are staggered on the belt 66 so that each group of carriers supports only one pin. The pins are thus raised individually and discharged onto the butt feed device individually so that the pins are prevented from piling up on the carriers or on the butt feed screws.

In order to discharge the pins from the elevator so that they pass to the butt feed device the elevator is provided with discharge fingers 74 secured to the slats 70 of the belt above those slats from which the pin carriers 72 project. The fingers 74 extend parallel to the face of the slats and project downward between the spaced carriers 72. As the slats to which the discharge fingers 74 tilt rearwardly with the belt 66 to pass over the roll the discharge fingers move therewith and the lower ends thereof swing outward between the carriers 72 and away from the plane in which the lower portion of the belt is moving. In this way the pins on the carriers are pushed off the carriers onto the butt feed device 64. The belt then travels down at the rear of the mechanism and beneath the lower driving roll 75. The latter roll is preferably driven by a separate motor 76 and is controlled to cause the elevator to be actuated only when the collector is in a receiving position and it is desired to raise pins from the pit to charge the collector therewith.

The butt feed device

The butt feed device 64 serves to invert the pins where necessary to cause all of the pins to be delivered to the right as seen in Fig. 4 so that they pass to the collector 78 butt end foremost. The butt feed device illustrated embodies two shafts or butt feed screws 80 and 82 formed with oppositely directed helical projections 84. The shafts are spaced apart a distance less than the greatest diameter of the pins whereby the pins are supported by the shafts but they are inverted and advanced by the convolutions of the helical projections 84 as the shafts are rotated. The shafts are provided at their ends with gears 86 driven to rotate the shafts at the same speed while the helical projections are arranged on the shafts so that the projections are adjacent each other as shown in Fig. 4. On rotation of the shafts the convolutions 84 therefore appear to travel side by side lengthwise of the shafts.

The portion of each pin which engages the shafts 80 and 82 is adjacent to the portion of the pin of greatest diameter whereas the center of gravity of the pin is above the portion of greatest diameter. For this reason when the pins fall on the shafts 80 and 82 with the heads thereof extending toward the right as seen in Fig. 4 the convolutions 84 on the shafts engage the pins near the butt end thereof and raise the butt ends. This action is aided by the fact that the center of gravity of the pins is on the opposite side of the point of support for the pins whereby the pins are caused to turn over or be inverted. The center of gravity is then on that side of the point of support of the pins against which the convolutions 84 act and since these convolutions are not effective to raise the center of gravity of the pin appreciably the pins are simply pushed along the shafts with the butt end foremost and are delivered to the chute 88 in the proper position to be received by the collector. Pins falling on the shafts of the butt feed device with the butt ends thereof already extending toward the right as seen in Fig. 4 are engaged by the convolutions on the shafts in the same manner as the inverted pins and are carried forward by the helical projections so that they also are discharged into chute 88 butt end foremost.

By employing an elevator which serves to deliver pins to the butt feed device individually, the pins are always free to turn over without interference from other pins and all danger of overlapping which might prevent inversion of a pin is avoided. The vertical spacing of the pin carriers 72 on the belt 66 and the speed of rotation of the butt feed screws are also chosen so that pins deposited on the butt feed screws by one group of carriers will be discharged to the chute 88 before other pins are deposited on the butt feed screws so that the pins are inverted readily in every case.

The chute 88 down which the pins pass to the collector 78 is formed with rollers 90 so that the pins will not stick or jam in the chute. The lower discharge end 92 of the chute is turned downward to direct the pins into the cups 94 of the collector 78.

The collector

Figure 5:
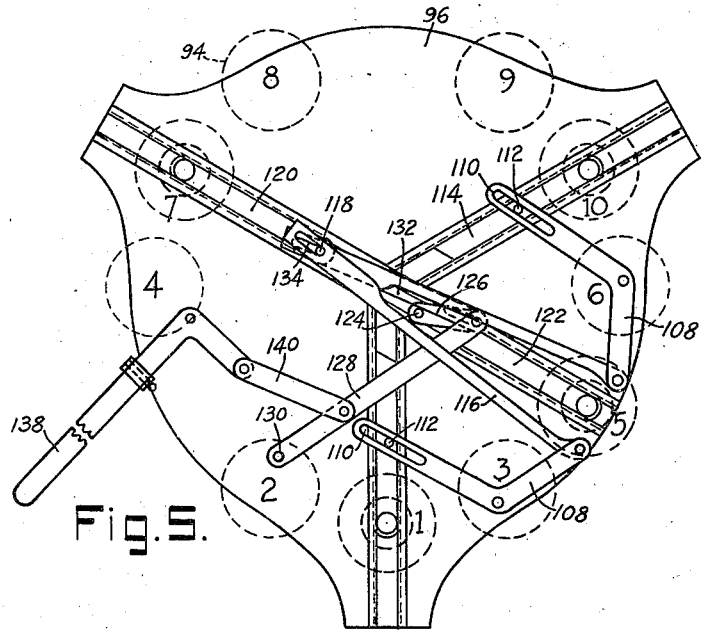
Figs. 5 and 6 are plan views of the collector showing the elements thereof in different positions.
Figure 6:
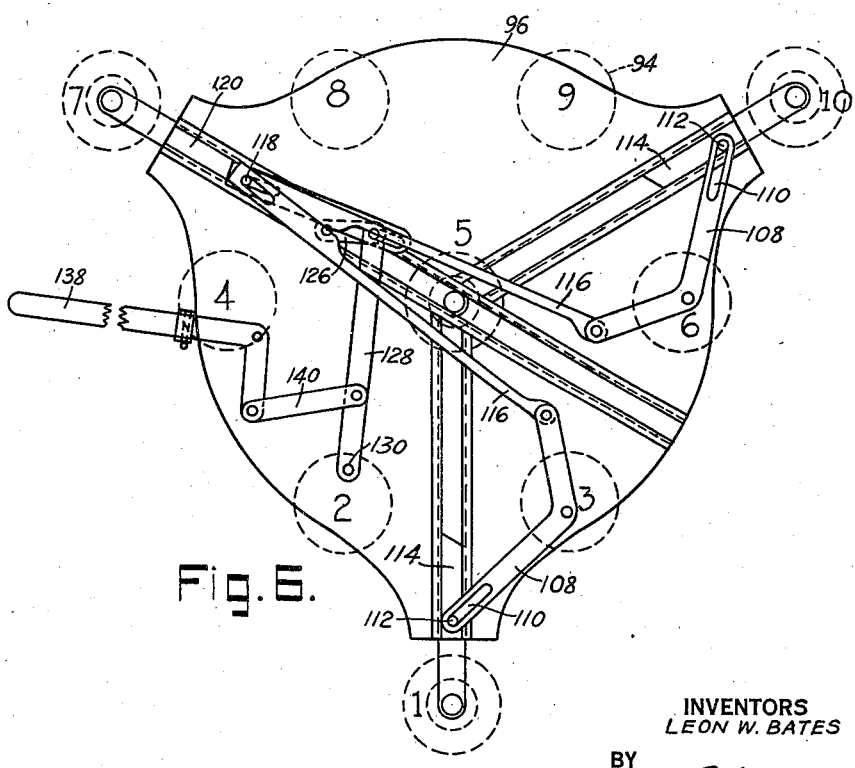

The collector 78 is provided with a table 96 mounted for rotation about a central bearing 98 and having castors 100 movable on a platform 102 beneath the table. Ten cups 94 are carried by the table and as shown in Figs. 5 and 6 are numbered to correspond to the conventional numbers given to the pins they are to receive. When in their loading position of Fig. 5 the cups are arranged circularly but four of the cups are movable from the circular position to the position of Fig. 6 to bring the cups and pins to their triangular playing arrangement. For this purpose the cups which receive pins numbered 1, 7, and 10 are moved outward from their circular loading positions to their triangular playing position whereas the cup which received the pin numbered 5 is movable inward to a central position as seen in Fig. 6.

When in the circular loading position and when ready for pins to be deposited in the cups, the cup which receives number 8 pin is located beneath the discharge end 92 of the chute 88. Each cup is provided with a contact member 104 positioned so that a pin deposited in the cup will complete an electrical circuit to cause table 96 to be rotated clockwise as seen in Fig. 5, to bring another cup beneath the discharge end 92 of the chute 88. In this way all of the cups are filled and thereafter the cups are moved from their circular loading position to their triangular playing arrangement by any suitable means.

A preferred construction for moving the cups from the loading to the playing arrangement is illustrated in Figs. 5, 6 and 7 wherein the six cups which receive pins numbered 2, 3, 4, 6, 8 and 9 are mounted on a cover member 106 movable with the table 96. Beneath this cover are bell cranks 108 pivotally mounted on the table for actuating the cups that receive pins numbered 1 and 10. One arm of each of these bell cranks is slotted at 110 to receive a pin 112 attached to one of the slides 114 by which the cups for pins 1 and 10 are carried. The opposite ends of the bell cranks 108 are connected by links 116 to a stud 118 on slide 120 by which the cup for pin number 7 is moved into and out of its circular and triangular positions. In this way movement of the cup for pin 7 actuates the bell cranks 108 to cause pins 1, 7 and 10 to move in and out together.

The cup for pin number 5 is carried by a slide 122 having a stud 124 connected by the link 126 to a lever 128 pivotally mounted on the table at 130. The slide 122 for pin number 5 is connected by link 132 to the slide 120 for pin number 7 which in turn actuates the bell cranks 108 and the slides 114 for pins 1 and 10. Thus the lever 128 when actuated serves to actuate all of the cups. However, since the distance which the cup for pin 5 must be moved is greater than the distance which the cups for pins 1, 7 and 10 are moved in shifting from the circular to the triangular positions, the links 116 are slotted at 134 to permit limited movement of cup 5 and link 132 in either direction before actuating the other slides and cups. The desired lost motion is thus provided to enable the cup for pin 5 to be moved prior to movement of the remaining cups on the table but when slide 122 has moved far enough to bring the end of slot 134 into engagement with stud 118 on slide 120 all of the cups and slides are moved to their limiting positions.

The actuating means for the lever 128 by which slide 122 and the remaining slides and the cups are moved is in the form of an actuating arm 138 connected to lever 128 by a link 140 and constructed so that the end thereof extends beyond the table 96.

The table 96 and cups 94 are rotated step by step to bring each cup into position beneath the discharge end 92 of chute 88 by means of a motor 142 mounted on a carriage 144 supporting the table. The motor is provided with a crank 146 connected by link 148 to a reciprocating member 150 slidable on guide bars 152. The reciprocating member has a spring actuated plate 154 positioned to engage pins 156 projecting downward from table 96 so that as the member 150 moves forward the actuating plate 154 is deflected to pass the pins but on rearward movement the deflector plate engages a pin to rotate the table one step to bring another cup into position to receive a pin. As hereinafter described the electrical circuits controlling the operation of motor 142 serve to cause the reciprocating member 150 to advance the table two steps to bring the cups for pin 2 into its receiving positions and serve to stop operation of the motor when all of the cups have been filled.

In order to prevent movement of the table and cups more than one step on each operation of the reciprocating member 150 a lock is provided as shown in Fig. 7. The lock shown is in the form of a pivoted arm 158 having a locking lug 160 positioned when raised to engage one of the pins 156 on the opposite side of the table from the reciprocating member 150. A locking bar 162 pivotally mounted beneath the platform 102 on which the table is mounted, is located with the end thereof in position to be engaged by a cam element 164 on the reciprocating member 150 which on its rearward movement to rotate the table depresses the locking bar 162. The opposite end of the locking bar 162 is thus raised to cause the locking lug 160 of pivoted arm 158 to intercept a pin and prevent continued rotation of the table as the reciprocating member 150 reached the end of its operating stroke. When the reciprocating member 150 moves forward during its idle return stroke the cam element 164 moves from the end of the locking bar 162 and locking lug 160 is retracted by spring 166 whereby the table is released for rotation on the next operation of the reciprocating member.

Back-lash of the table on engaging the locking lug 160 is prevented by a spring pressed arm 168 positioned to engage another pin 156 on movement of the table to its new position.

The table 96 and its related mechanism for receiving and arranging the pins are preferably located at the rear of the alley and over the pit so that they leave ample room above the alley for movement of the pins and clear observation thereof. In order to move the pins from the collector to the playing surface of the alley it is necessary to provide means for moving the pins forward and for depositing them upon the playing surface of the alley. In order that the spotting device which places the pins on the alley may be accurate and as simple as possible in its operation it is preferable that it be restricted to vertical movements and that the movement of the pins forward into a position over the end of the alley be effected by means of the collector rather than the spotting device.

For this purpose the carriage 144 which supports table 96 of the collector is provided with wheels 170 running on tracks 172 at the sides of the framework 62. The table and cups are thus movable from a rearward loading position beneath the chute 88 and to a forward spotting position in which the pins are located above the rear end of the alley and beneath the spotting device 174.

The actuating arm 138 which projects from the table 96 and is movable to cause the cups to be moved into and out of their triangular playing arrangement, is operated as an incident to movement of the carriage and table into and out of its forward position. For this purpose the arm 138 is positioned to engage a yieldable stop 176 on the framework 62 as the carriage 144 moves forward. In this way the arm 138 is moved from the full line position of Fig. 5 to the full line position of Fig. 6 and the pins carried by the cups on the table 96 are moved from their circular arrangement of Fig. 5 to the triangular arrangement of Fig. 6. After the arm 138 reaches the full line position of Fig. 6 it passes over the end of the yieldable stop 176 into a position in which it will again engage and be actuated by the stop 176 to return the cups to their circular loading arrangement, upon rearward movement of the carriage and table to their loading position.

Since the arm 138 projects some distance from the table 96 and rotates with the table it might interfere with the operation of the spotter or other elements of the construction. In order to eliminate this danger the end 178 of the arm 138 is hinged at 180 and provided with a follower 182 which engages a cam 184 on the platform 102 of the carriage. The cam 184 is so formed that the end of the arm may project horizontally outward to engage the yieldable stop 176 when on the left hand side of the table 96 as seen in Figs. 5, 6 and 7 but is elevated and held nearly vertical when the table rotates and the arm 138 is in an inactive position.

The carriage by which table 96 is carried is moved forward and rearward by a reversible motor 186 controlled by operation of the spotting device 174.

The spotting device

The spotting device 174 is vertically movable on the guide rods 188 of the framework 62 and is provided with a frame 190 having ten pairs of gripping members thereon. The gripping members shown are in the form of levers 192 and 194 pivotally connected at 196 on the frame 190. The lower ends 198 of the levers are formed with extended sides 200 adapted to engage the necks of the pins below the enlarged heads thereof even when the pins are displaced some distance from the spot on which they were originally placed.

In this way a pin which has "walked" from its original position a distance of several inches may be gathered in and reset in its original position. The inner faces of the sides 200 are preferably provided with rubber liners to prevent the pins from slipping and to avoid injury thereto.

The spotter frame is arranged to be lowered so that the gripping members may be actuated to grasp the pins, after which the frame and gripping members may be raised carrying the pins therewith to lift the pins from the cups 94 and permit the carriage and cup carrying table 96 to be moved rearwardly out of the way of the spotter and into position to receive additional pins from the elevator and butt feed device. Thereafter the spotter frame with its gripping members holding the pins may be lowered to place the pins on the playing surface of the alley.

The upper ends of the levers 192 are connected to lower bars 202 of the actuating means for the gripping members whereas the upper ends of the levers 194 are connected to upper bars 204 of the actuating means. These bars are moved horizontally and in opposite directions to open and close the gripping members by means of toggle links 206 connected to a vertically movable operating rod 208. The point 210 on the rod 208 to which links 206 are connected is below the upper and lower bars 202 and 204 so that when the rod is raised the links spread apart and force the rods 202 and 204 in opposite directions to close the gripping members. When the rod moves downward the links 206 draw together moving the bars 202 and 204 to open the gripping members.

The operating rod 208 is moved up and down by a grip motor 212 having a reducing gear with a crank 214 to which the operating rod is connected by a link 216. The motor 212 is operated to cause the crank 214 to move through an arc of 180° on each operation thereof and is actuated under the control of electrical circuits, whereby the operation and timing of the movements of the gripping members may be readily and accurately coordinated with the operation of other elements of the combination.

The operating rod 208 also serves to actuate an oscillating switch 218 controlling certain of the electrical circuits in the system. On upward movement of the operating rod contact arm 220 of the oscillating switch is moved over contacts 222, 224 and 226 and is then tripped to return to an inactive position under the action of a spring 228. Thereafter when the operating rod moves downward the switch is oscillated in the opposite direction moving contact arm 230 over contacts 232, 234 and 236 whereupon it is tripped so that the switch returns to its normal open position.

Each of the gripping members is also provided with a "feeler" in the form of a downwardly facing cup 238 movably located between the gripping members in position to engage the head of a pin when the spotter is lowered to lift the pins from the alley or to remove them from the collector cups. A contact carrying rod 240 is secured to each feeler cup and provided with a conducting head 242 which engages the normally closed series connected contacts 244 of a "strike circuit" 246 to open these whenever the rod 240 is in its raised position. The conducting head 242 engages parallel connected contacts 248 to allow current to flow through a "feeler circuit" 250 when raised by engagement of the cup 238 with the head of a pin.

The spotter is raised and lowered by a reversible motor 252 under control of a reversible spotting switch 254.

The sweep

The sweep device illustrated in Fig. 1 is typical of various devices that may be employed for removing the pins from the alley preparatory to operation of the spotting device. In the construction shown arms 258 are pivotally mounted on the framework 62 near the upper portion thereof and on opposite sides of the alley and are connected at their free ends by a cross bar 260. The sweep is actuated by the continuously operating pit conveyor motor through the action of a solenoid operated clutch 262 which when engaged drives a shaft 264 having cranks 266 on opposite ends thereof. Links 268 are connected to the arms 258 to lower the arms and cause pins to be swept from the alley into the pit during the first half rotation of the cranks 266 and to raise the sweep and restore it to its normal inactive position during the second half rotation of the cranks. The operation of the sweep is made more smooth by the action of a counter weight 270 connected to the cross arms 258 by a cable 272.

In order that the pins may be cleared from the alley effectively a sweep board 274 is suspended by pivoted rods 276 from the cross bar 260, and provided with wheels which run in the gutters on opposite sides of the alley. The sweep board normally tends to hang vertically from the cross bar but is caused to swing rearwardly upward from the playing surface of the alley by cam elements 278 carried by the framework 62 and positioned to engage followers 280 on the projecting ends of the pivoted rods 276.

With this construction operation of the clutch 262 to rotate cranks 266 in a counter clockwise direction from their full line position of Fig. 10, serves to cause the sweep arms 258 to move downward whereby the followers 280 on the projecting ends of pivoted rods 276 move over the cam element allowing the sweep board 274 to descend onto the alley well in advance of the spot for number 1 pin. As the sweep arms continue to move downward over the alley to push the pins into the pit after which the sweep arms are raised moving the sweep board forward over the alley until the followers on the pivoted rods 276 are brought into engagement with the cam elements 278. Further upward movement of the sweep arms 258 then causes the sweep board to move upward away from the playing surface of the alley until it reaches its raised or inactive position as shown in Fig. 1.

The electrical circuits

The mechanism described above and the various devices embodied therein may be controlled and actuated by any suitable means but as herein described they are preferably controlled and actuated by electrical means coordinated to effect automatic operation of each of the devices in predetermined sequences depending upon the conditions of play.

Figure 11:
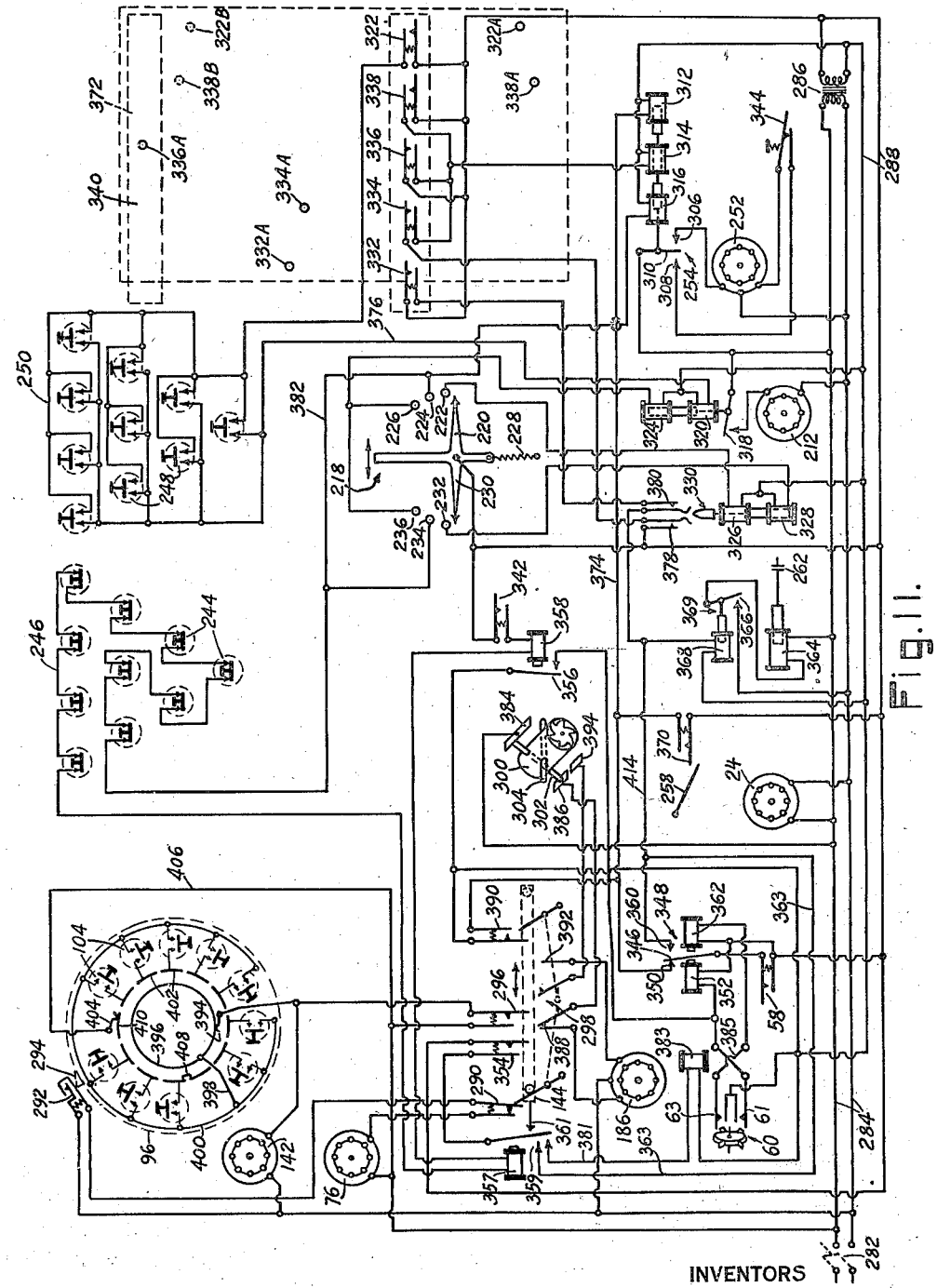
Fig. 11 is a wiring diagram showing a preferred system for controlling operation of the mechanism, and Figs. 12 to 18 inclusive are a series of diagrammatic side elevations of the mechanism in various stages of its operation.

The wiring diagram illustrated in Fig. 11 shows a typical and preferred combination of electrical devices and connections for controlling and actuating the mechanism. In this system current is supplied from a conventional 110 volt power line through master switch 282, which may be located in the manager's office or at the end of the alley and it may be operated manually, by coin controlled means or otherwise as desired. The 110 volt current passes through lines 284 to the various motors for driving the devices whereas low voltage current for actuating relays and solenoids is supplied from the power line through a transformer 286 to conductors 288.

The power for actuating the various devices is preferably supplied by six separate motors referred to above. The pit conveyor motor 24 is connected directly to the power line 284 and operates the conveyor belt 18, the ball return device and the sweep. The elevator motor 76 drives the elevator belt 66 and butt-feed screw 80 and 82 and is controlled by a circuit including elevator switch 290 actuated by the carriage 144 by which the collector is moved to its loading position beneath discharge end 92 of chute 88. The circuit is broken by means of a spring contact 292 movable to open position by the cam 294 on the collector table 96 to stop operation of the elevator when the cups on the collector are filled.

Rotation of the collector table 96 with its cups 94 is effected by means of the collector motor 142 under the control of a circuit including the carriage operated collector switch 296. This motor is operated periodically to rotate the table step by step from one position to another on closing of the pin actuated contacts 104 in the pin receiving cups 94.

The carriage motor 186 employed for moving the carriage back and forth between its loading position over the pit and its forward position over the alley is connected through a carriage operated reversing switch 298 to a drum type control switch 300 having contact arms 302 and 304. The drum switch is rotated by mechanical means (not shown) through an arc of 60° on each movement of the spotting device to its uppermost position.

The reversible spotter motor 252 which raises and lowers the spotter is controlled by a circuit including the spotter switch 254 which has a "down contact" 306 an intermediate "stop" position and an "up contact" 308. Movement of the contact arm 310 of the spotter switch is effected by means of a "down solenoid" 312, a "stop solenoid" 314 and an "up solenoid" 316.

The grip motor 212 is controlled by a switch 318 actuated by a starting solenoid 320 connected through the parallel contacts 248 of the "feeler circuit" 250 to a spring contact 322 carried by the spotter frame and by the stopping solenoid 324 connected to the uppermost contacts 226 and 236 of the oscillating switch 218 to stop operation of the grip motor when the gripping members reach their fully opened or fully closed positions. The lower contacts 222 and 232 of the oscillating switch serve to complete circuits for energizing the solenoids 326 and 328 respectively of the jack switch 330 while the central contacts 224 and 234 of the oscillating switch serve to complete alternative circuits for energizing the "up solenoid" 316 of the spotter switch 254.

The spotter frame by which spring contact 322 is carried also carries spring contacts 332, 334, 336 and 338 whereby these contacts are moved into and out of engagement with actuating pins on a side panel 340 at predetermined times during the operation of the spotter. The spotter on moving downward to its lowermost position engages a "strike" switch 342 connected to the series contacts 244 of the "strike circuit" 246 and on moving upward beyond its normal upper limit actuates a safety switch 344 to break the spotter motor circuit.

The operation of the mechanism is initiated by means of the ball actuated starting switch 58 of the ball return device, which is connected to the armature 346 of a ball contact relay 348. The armature has previously been moved into engagement with a "first ball contact" 350 but is movable in the opposite direction to engage a "second ball contact" 260 by means of a magnet 352 upon closure of one of the contacts 61 and 63 on each 90 degree rotation of the other ball actuated switch 60 of the ball return device.

The clutch 262 by which the sweep is driven from the motor 24 is actuated by a solenoid 364 under control of the switch 366. This switch in turn is actuated by the solenoid 368 after the first ball has been rolled or in the event of a strike is held closed by a spring detent 369 until released by the sweep arm 258. Operation of the sweep arms 258 also serves to actuate the switch 370 to close a circuit through the down solenoid 312 of the spotter switch so that the spotter will descend to place pins on the playing surface when the sweep has removed the "dead wood" from the alley.

The operation

The operation of the mechanism and electrical circuits will be described by reference to the diagrammatic illustrations of Figs. 12 to 18 together with the wiring diagram of Fig. 11.

Figure 12:
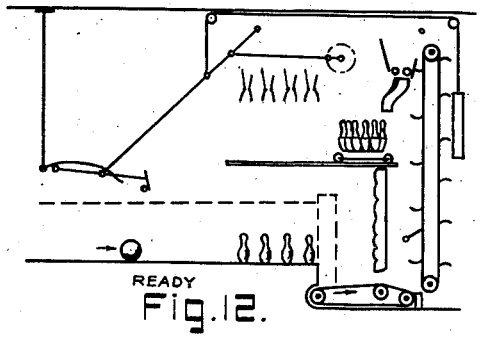

When in the starting position ready for operation the elements of the mechanism are in the locations indicated in Fig. 12 and the contacts and circuits are in the positions indicated in Fig. 11. The pins are on the playing surface of the alley, the pit conveyor is operating, the elevator and butt feed device are stationary and the carriage 144 and collector are in their rear position over the pit. The spotter and sweep are of course elevated to leave the alley clear for play.

In the wiring diagram the armature 346 of ball contact relay 348 is in engagement with "first ball contact" 350, the elevator starting switch 290 is closed by the carriage 144 but the circuit is opened at switch 292 by the cam 294 on the collector table 96. Drum switch 300 is in its "off" position, the spotter switch 254 is in its "stop" position and the spotter frame and the spring contacts carried thereby are in their raised position shown in dotted lines at 372. Actuating pins 338$^B$ and 322$^B$ are movable to projected and retracted positions by mechanical means (not shown) actuated by the carriage, but on starting operations they are retracted. The series "strike circuit" 246 is closed and the "feeler circuit" 250 broken at all points since there are no pins in the gripping members.

When the first ball is rolled it passes into the pit and in falling on the belt 18 is engaged by the diagonal ribs 26 thereof and rolled to the left as seen in Fig. 2 so that it will enter the open side of the hood 36 and come to rest on the lifting forks 30. The ball also engages the ball contact lever 54 to move hook 48 into engagement with the links of the chain 38 so that the ball is raised to be discharged onto the ball track and returned to the player.

The movement of ball contact lever 54 serves to close the starting switch 58 momentarily whereupon current flows from low voltage conductors 288 through switch 58 and armature 346 of the ball contact relay 348 to the "first ball contact" 350 and thence through conductor 374 to "down solenoid" 312 of the spotter switch and back to the opposite side of the low voltage line. The "down solenoid" when operated moves the contact arm 310 of the spotter switch into engagement with down contact 306 closing a circuit through the spotter motor 252. The spotter thereupon moves downward past retracted actuating pins 338ᴮ and 322ᴮ. In passing actuating pins 332ᴬ and 334ᴬ the spring contacts pass over the actuating pins without closing a circuit so that the spotter continues to descend until pin 322ᴬ closes spring contact 322 connected to the parallel contacts of "feeler circuit" 250.

Figure 13:
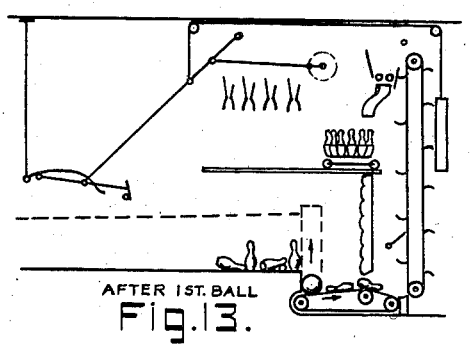

If the first ball rolled was not a strike some of the pins will remain standing on the alley as shown in Fig. 13. The standing pins will engage the cup shaped feelers 238 between the gripping members as the spotter descends to the position shown in Fig. 14 and the gripping members pass down about the necks of the standing pins. The feeler contact carrying rod 240 of one or more gripping members will thus be raised as the spotter descends completing a circuit through the parallel contacts of the "feeler circuit" 250 so that current will pass through conductor 276 to solenoid 320 for closing the grip motor switch 318. At the same time the series connected "strike circuits" is broken. The grip motor 212 is thus actuated to move the operating rod 268 of the gripping device upward to close the gripping members about the necks of the standing pins.

As the spotter continues to move downward and shortly after spring contact 322 is closed, the spring contact 338 is actuated to close a circuit through the "stop" solenoid 314 of the spotter switch whereby further descent of the spotter is checked. As the spotter comes to rest at its lowermost position it closes the spotter raising switch 314 connected to the series contacts 244 of the "strike circuit" 246 but since this circuit is broken by the standing pins engaging the feelers 238 the spotter remains in its lowered position while the gripping members move to engage the standing pins.

As the gripping members close about the necks of the pins the oscillating switch 218 is actuated to move contact arm 220 in a counterclockwise direction as seen in Fig. 11 whereby contact 222 is engaged to actuate solenoid 326 and throw in the jack switch 330. On further movement of the contact arm 220 contact 224 is engaged to energize the up solenoid 316 of the spotter switch to cause the spotter to rise and raise the standing pins from the playing surface of the alley and contact 226 is engaged to energize solenoid 324 of the grip motor switch to break the grip motor circuit.

Figure 14:
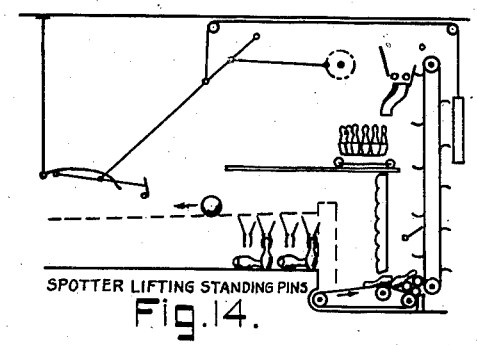
Figure 15:
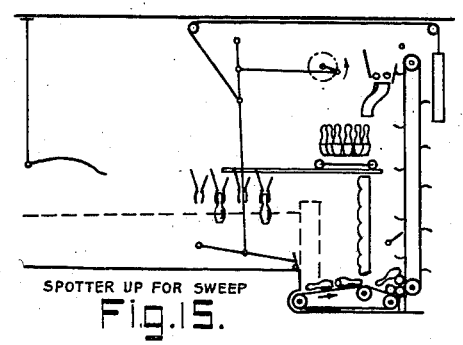

As the spotter continues to rise spring contact 334 is moved into engagement with its actuating pin 334ᴬ and a circuit is closed through the contact 378 of the jack switch 330 to energize stop solenoid 314 of the spotter switch without waiting for the spotter to travel to its uppermost position. At the same time spring contact 332 is actuated to close a circuit through contact 380 of the jack switch to energize solenoid 368 of the sweep switch 366. The solenoid operated clutch 262 is thus actuated to cause the sweep to descend and remove the "dead wood" from the alley as shown in Fig. 14 after which the sweep returns to its raised position. Upon return movement of the sweep, the sweep arm 258 closes switch 370 completing a circuit through conductor 374 to energize the "down solenoid" 312. The spotter switch is thus operated to cause the spotter motor 252 to lower the pins held by the gripping members and replace them on the playing surface of the alley in their original positions as shown in Fig. 15.

As the pins are lowered onto the alley by the spotter spring contact 322 is actuated to cause the grip motor 212 to operate and open the gripping members while spring contact 338 is actuated to stop the spotter motor. The operation of the grip motor to release the pins moves contact arm 230 of the oscillating switch over contacts 232, 234 and 236 whereby the jack switch 330 is opened, current is passed through contact 234 and conductor 382 to the up solenoid 316 of the spotter switch and the grip motor switch 318 is opened to stop further movement of the gripping members. The empty spotter then rises passing actuating pins 332ᴬ and 334ᴬ which simply actuate contacts in circuits opened at the jack switch and finally reaches its fully raised position operating spring contact 336 to stop operation of the spotter motor.

While those operations initiated by the first ball and described above are taking place the other switch 60 of the ball return device is actuated by the bearing block 44 as the ball is raised from the pit to be returned to the player. On actuation of switch 60 after the first ball current passes through one of the contacts 61 or 63 from the low voltage line to magnet 362 of the ball contact relay whereby the armature 346 thereof is moved into engagement with "second ball contact" 360, to prepare the system for operation when the next ball is rolled. The second ball can then be rolled at any time while further operations of the collector and spotter take place.

The contacts 61 and 63 of switch 60 are connected through a reversing switch 385 controlled by the solenoid 383 energized by closure of switch 356 whereby the contact closed when the first ball is rolled in each two ball frame will insure movement of the armature 346 to its second ball position and will insure movement of the armature to its first ball position at the end of each two ball frame and after every strike.

As the spotter reaches its uppermost position after resetting the standing pins it rotates the drum switch 300 through an arc 60° bringing switch arm 302 into engagement with contacts 384 and 386 so that a circuit is completed through the drum switch and contact 388 of the carriage operated reversing switch 298 whereby the carriage motor 186 is actuated to move the collector forward into position over the alley and beneath the spotter.

Figure 16:
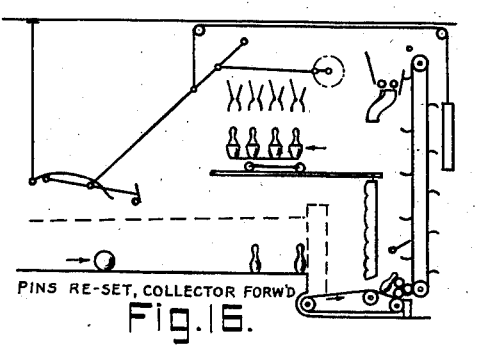

On reaching its foremost positions as shown in Fig. 16 the carriage closes switch 390 completing a circuit through down solenoid 312 to actuate the spotter switch and cause the spotter to descend. At the same time the carriage throws the reversing switch 298 to engage contact 392 but since this circuit is open at contact 394 of the drum switch the carriage remains in its forward position.

Figure 17:
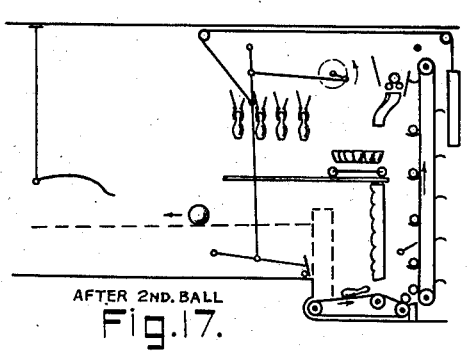

During forward movement of the carriage 144 the cups 94 on table 96 are moved from their circular loading arrangement to their triangular playing arrangement and are therefore held in position to be received by the triangularly arranged gripping members on the spotter. At the same time the actuating pins 338ᴮ and 322ᴮ are projecting so that the spotter descends to bring the gripping members into place about the necks of the pins on the collector the spring contact 338 is actuated to operate the stop solenoid of the spotter switch and bring the gripping members to rest with the heads of the pins bearing against the feelers 238 to close the "feeler circuit" 250. At substantially the same time the contact 322 is actuated to energize solenoid 320 and close the grip motor switch 318 for actuating the grip motor 212. The oscillating switch 218 is then actuated as before to cause the jack switch to be thrown in, the spotter to rise and the grip motor to cease operation. As the spotter reaches its uppermost position and is stopped by operation of spring contact 336 the drum switch 300 is again rotated 60° to bring contact arm 304 into engagement with contacts 384 and 394 and a circuit is completed through the closed contact 392 of the reversing switch 298 to cause the carriage motor 186 to move the carriage back into position over the pit as shown in Fig. 17.

During return movement of the carriage the arm 138 of the collector engages the yieldable stop 176 to move the cups 94 on table 96 from their triangular playing arrangement to their circular loading arrangement. Return movement of the carriage also serves momentarily to close the starting switch 296 of the collector motor circuit, whereby the collector motor 142 is energized to rotate the table 96 and cups 94 one step to bring the cup for pin number 8 beneath the discharge end 92 of the chute 88. This movement of the table serves to remove cam 294 on the table from beneath the spring contact 292 so that as the carriage moves on to its rear position and closes the control switch 290 a circuit is completed through the elevator motor 76 and pins are raised from the pit to the butt feed device and discharged butt end foremost down the chute 88 to the cups on the collector table.

The collector motor circuit after being closed momentarily by starting switch 296 is broken but rotation of the table prepares an alternative circuit extending from the motor 142 through brush 394, ring 396, connection 398 and ring 400 to each of the pin operated cup contacts 104. The opposite side of the cup contacts are connected to contact segments 402 by brush 404 which completes a circuit through conductor 406 whenever the cup contact 104 is closed by the dropping of a pin into the cup beneath chute 88. When this circuit is closed the motor 142 is driven to bring the next cup into place to receive a pin from the chute. The circuit is then broken by movement of the segment 402 connected to the closed cup contact away from the brush 404 so that the next cup remains in position beneath the discharge end of the chute 88 until a pin is deposited therein. By connecting the contact segments the cups for pins 4 and 2 by a connection 408 the collector motor is driven for a period long enough to pass over the space between these cups to bring cup 2 into place to receive a pin.

When the last cup receives a pin (pin 9) the collector motor rotates the table to bring brush 404 into engagement with a blank space or disconnected segment 410 whereby the circuit is broken and the collector table held in a neutral position with the discharge end 92 of the chute 88 over the space between the cups for pins 9 and 8. At the same time the final movement of table 96 brings cam 294 into engagement with spring contact 292 to break the elevator motor circuit so that no more pins are delivered to the collector. Any pins already discharged to the chute 88 pass between the cups and engage deflector 412 on the table 92 so as to be returned to the pit.

The foregoing operations of the mechanism complete a cycle wherein the pins left standing after the first ball is rolled are raised from the playing surface, the fallen pins are removed from the alley, the standing pins are reset on the alley, a new set of pins is transferred from the collector to the spotter and the spotter has returned to its raised position and the collector cups have been refilled ready for a second operation.

Figure 18:
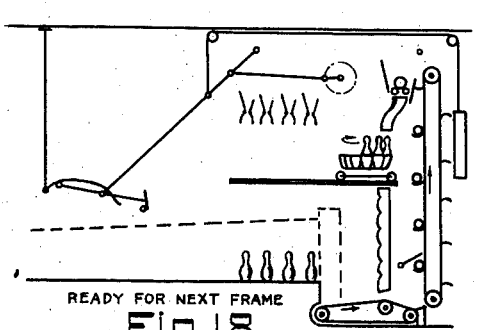

When the second ball is rolled and returned to the player the starting contact 58 is again actuated but since the armature 346 of the ball contact relay is in engagement with second ball contact 362 current passes through conductor 414 to the solenoid 368 of the sweep switch to actuate the same and cause clutch 262 to be engaged so that all of the pins remaining on the alley, whether standing or "dead wood" are moved into the pit as shown in Fig. 17. Thereafter when the sweep returns to its raised position switch 370 is closed to cause the spotter to descend and place a new set of pins on the playing surface of the alley as shown in Fig. 18. As the spotter returns to its fully raised position as shown in Fig. 18 the drum switch 300 is rotated to its "off" or starting position and the system is returned to its original condition ready for play. The second ball when returned also actuates the switch 60 to close that one of the contacts 61 and 63 which is then connected to the magnet 352 so that the armature 346 is returned to engagement with the first ball contact 350 to prepare the circuit for the next frame of play.

The operation of the mechanism is thus made fully automatic and each of the devices embodied therein is caused to be actuated in predetermined sequence depending upon the conditions of play.

The series of operations which have been described above are those which take place in the event no "strike" is made on the first ball. If a "strike" should be made and there are no pins left standing when the first ball passes into the pit the empty spotter will descend as before but the "feeler circuit" will remain open at all points and the "strike circuit" will remain closed. Spring contact 322 will then perform no function when closed and descent of the spotter will be checked by closure of spring contact 338. The "strike" switch 342 will be closed as the spotter comes to rest in its lowered position and since the strike circuit 246 is now closed at all points current will flow through conductor 382 to energize the up solenoid 316 of the spotter switch and cause the spotter to rise. Completion of this circuit also energizes magnet 358 to close switch 356 and complete a circuit through solenoid 352 of the ball contact relay 348 to return the armature thereof, which was previously moved to "second ball contact" 360, back to the "first ball contact" 350. Completion of a circuit through strike switch 342 energizes magnet 357 to close switch 359 which is held closed by a spring detent 361. Switch 359 also serves to close a circuit through solenoid 383 of the reversing switch 385 to cause the contacts 61 and 63 of the ball actuated switch 60 to be connected with the magnets 352 and 362 in such a manner as to insure return of the armature 346 of the ball contact relay to engage "first ball contact" 350 at the end of every frame whether a strike is rolled or not.

As the spotter returns to its raised position the jack switch is open so that contacts 332 and 334 are inactive and the spotter moves to its uppermost position whereby the drum switch is rotated 60° to actuate the carriage motor 186 to move the collector out beneath the spotter and the previously described operations take place to remove the pins from the collector. The carriage 144 returns to its loading position and in so doing closes switch 354 to complete a circuit through closed switch 359 and conductor 363 to conductor 414 connected to solenoid 368 of the sweep switch

366. An arm 365 on the carriage 144 engages the spring detent 361 of switch 359 to cause the switch to open shortly after closure of switch 354. Thus the sweep is actuated to clear pins from the alley for the next frame of play and the spotter is caused to descend to reset the pins on completion of the sweeping operation.

From the foregoing description it will be apparent that the mechanism is fully automatic and while described for use when two balls are rolled by each player it may be modified readily for use when three or more balls are rolled by each player or the game is otherwise modified.

It will also be noted that the mechanism is adapted to be applied to existing bowling alleys without change in the playing surface so that it is not necessary to relay the alley and regulation wooden pins may be used thus avoiding change in existing equipment. Moreover, it is possible to eliminate the spotting plates which are often embedded in the alleys to receive spotting pins and so avoid the danger of misplay and injury to the balls due to a raised or displaced plate.

The construction and operation of the various devices embodied in the mechanism are also of such relative simplicity that they may be made easily and economically and applied to existing alleys without great installing expense or rearrangement of alleys and without making structural changes in the building in which the alleys are housed.

While a preferred form and arrangement of the elements and devices have been illustrated and described above it will be evident that numerous changes and modifications may be made in the form, constructions and arrangement of the parts without departing from the spirit of the invention. It should therefore be understood that the embodiment of the invention herein described and shown in the drawings are intended to be illustrative of the invention and are not intended to limit the scope thereof.

I claim:

1. In combination with a bowling alley having a pit at the end thereof into which balls and pins pass in the course of play, means for separating the balls from the pins comprising a belt, and means mounting said belt for longitudinal movement within the limits of said pit, said belt being provided with spaced upwardly projecting ribs extending diagonally with respect to the direction of movement of the belt.

2. In combination with a bowling alley having a pit at the end thereof into which balls and pins pass in the course of play, means for separating the balls from the pin comprising means forming an inclined floor for the pit, a belt movable wholly within said pit in a longitudinal direction relative to said alley upward over said inclined floor and spaced upwardly projecting ribs on said belt extending diagonally to the direction of movement of said belt.

3. In combination with a bowling alley, pin setting mechanism comprising a rotatable device having circularly arranged elements for receiving and holding pins, means mounting said device for movement above said alley, means for moving said device into position over said alley and mechanism connected to said elements and responsive to movement of said device for moving said elements from said circular loading arrangement into a triangular playing arrangement.

4. In combination with a bowling alley having a pit at the end thereof, pin setting mechanism comprising a traveling support mounted for movement above said pit and alley, pin holding elements on said support for receiving and holding pins, mechanism connected to said elements for moving said elements on said support selectively into and out of a circular loading arrangement and a triangular playing arrangement and means for moving said support and pin loaded elements from a loading position over said pit to a playing position over said alley.

5. In combination with a bowling alley, pin setting mechanism comprising a collector having pin receiving elements, means connected to said elements for moving the same into and out of a circular loading arrangement, and a triangular playing arrangement, a carriage supporting said collector and movable into and out of a position above said alley and actuating means responsive to movement of said carriage for moving said elements from one arrangement thereof to another.

6. In combination with a bowling alley having a pit at the end thereof, pin setting mechanism comprising elements for receiving and holding pins, mechanism connected to said elements for moving said elements above said pit and alley in a substantially horizontal plane selectively into and out of a circular loading arrangement and a triangular playing arrangement, means for moving said elements from a loading position over said pit to a playing position over said alley, and means for lowering said pins while in their triangular playing arrangement onto the playing surface of the alley.

7. Apparatus adapted for use in combination with a bowling alley comprising means located adjacent the pit at the end of the alley for raising and positioning pins preparatory to resetting the same, a spotting device movable to deposit the pins upon the alley in a predetermined arrangement and a plurality of pin handling units on said device, a plurality of controls for said device, a plurality of pin actuated electric circuits associated with each of said units and said controls, and means responsive to the movement of said supporting device and dependent on the presence or absence of standing pins on said alley after the throwing of the first ball for selectively actuating one of said controls to cause said device to reset any standing pins or deliver a new set of pins to said alley.

8. In a pin setting machine for a bowling alley or the like, means for raising pins from the pit at the end of the alley, means for delivering said pins butt foremost to a predetermined point, means for receiving said pins movable successively past said point, mechanism for moving the pins so received away from said delivering means and positioning the same in substantially triangular playing arrangement, a device located above the playing surface of the alley for lowering the pins so arranged onto the playing surface, a plurality of pin gripping units mounted on said device in positions in substantial alignment with those occupied by the triangularly arranged pins, and a plurality of pin actuated controls associated with each of said units for selectively controlling the operation of said device to reset any standing pin or set a new frame of pins on said alley.

9. In combination with a bowling alley elements for receiving and holding pins, means for moving said elements and the pins carried thereby into a triangular playing arrangement, gripping means positioned to receive pins from said elements after arrangement thereof and mechanism for lowering said gripping means and releasing said pins to place them on the playing surface of the alley in their triangular playing arrangement, a plurality of sets of electric contacts carried by said gripping means, a parallel circuit, and a series circuit connecting each of said sets of contacts and pin engageable detectors associated with said gripping means for selectively engaging said contacts to make or break said series and parallel circuit to control the operation of said gripping means.

10. In pin setting mechanism for bowling alleys and the like, a pin setter movable towards and away from the alley, an electrical control system including two alternative circuits for controlling operation of the setter, one of said circuits having ten contacts connected in series and the other circuit having ten contacts connected in parallel and means carried by the setter and positioned to be actuated by a bowling pin standing on the alley for opening a contact in one of said circuits and closing a contact in the other of said circuits to control the operation of said setter.

11. In pin setting mechanism for bowling alleys and the like gripping units, a collector for receiving and holding pins to be engaged by said gripping units, means for moving said collector in a substantially horizontal plane above said alley and positioning pins held therein in substantially triangular arrangement beneath said gripping units, and means for effecting relative movement between said triangularly arranged pins in said collector and gripping units, and means for actuating said gripping units to grip said pins for removal from said collector.

12. In pin setting mechanism for bowling alleys and the like a spotter having a plurality of setter-resetter units each adapted to both set pins on and remove pins from the playing surface of the alley and means carried by the spotter and actuated by engagement with a bowling pin standing on the playing surface controlling operation of said spotter.

13. In a bowling pin setting machine for use with a bowling alley, pin setting mechanism comprising a rotatable device, circularly arranged pin receiving and holding elements supported by said device, means mounting said device for movement above said alley, means for moving said device and loaded elements into a predetermined position over said alley, mechanism connected to said elements for moving said elements from circular into a triangular playing arrangement, and means associated with each of said elements for controlling the rotation of said device.

14. In a bowling pin setting machine for use with a bowling alley, a rotatable device having a plurality of circularly arranged elements for receiving and holding bowling pins, pin feeding mechanism, means for rotating said device to move each element carried thereby into the range of operation of said mechanism to effect the delivery of a pin to each of said elements, means for moving said pin loaded device out of the range of said mechanism and into a predetermined position over said alley, and mechanism connected to said elements and responsive to movement of said device for moving said elements from said circular loading arrangement into a triangular playing arrangement.

15. In a bowling pin setting machine for use with a bowling alley having a pit at one end thereof, pin setting mechanism comprising a traveling support, means mounting said support for movement from a pin receiving position above said pit to a pin delivering position above said alley, a rotatable device mounted on said support, a plurality of circularly arranged pin holding elements carried by said device, means for delivering pins to each of said pin holding elements, means for moving said support from said pin receiving position to said pin delivering position over said alley, and means for moving said elements from said circular arrangement into triangular arrangement for delivery of pins carried by said elements in proper playing arrangement to said alley.

16. In a bowling pin setting machine for use with a bowling alley having a pin supporting bed, pin setting mechanism comprising a traveling support, a plurality of pin receiving and holding elements mounted on said support for travel therewith, means for delivering pins to each of said elements, means for moving said support from pin receiving position to a pin delivering position over said bed, mechanism connected to said elements and responsive to the travel of said support for positioning said elements in triangular playing arrangement, a pin setter mounted above said bed, and means for effecting relative movement between said support and setter to deliver said triangularly positioned pins in said elements to said setter.

17. In a bowling pin setting machine for use with a bowling alley having a pit at one end thereof and a pin supporting bed, a traveling support, means for moving said support between a pin receiving and a pin delivery position, a rotatable table mounted on said support, a plurality of circularly arranged pin receiving and holding cups carried by said table, means for delivering pins in succession to said cups, and means for imparting step by step rotation to said table to move empty cups into the range of operation of said pin delivering means for delivery of pins to said cups.

18. In a bowling pin setting machine for use with a bowling alley having a pit at one end thereof and a pin supporting bed, a traveling support, means for moving said support between a pin receiving and a pin delivery position, a rotatable table mounted on said support, a plurality of circularly arranged pin receiving and holding cups carried by said table, means for delivering pins in succession to said cups, means for imparting step by step rotation to said table to move empty cups into the range of operation of said pin delivering means for delivery of pins to said cups, and means associated with each of said cups for controlling the stepwise movement of said table.

19. In a bowling pin setting machine for use with a bowling alley having a pit at one end thereof and a pin supporting bed, a traveling support, means for moving said support between a pin receiving and a pin delivery position, a rotatable table mounted on said support, a plurality of circularly arranged pin receiving and holding cups carried by said table, means for delivering pins in succession to said cups, means for imparting step by step rotation to said table to move empty cups into the range of operation of said pin delivering means for delivery of pins to said cups, means associated with each of said cups for controlling the stepwise movement of said table, and mechanism connected to said elements and responsive to the movement of said support to said pin delivery position for moving said cups from circular arrangement into triangular playing arrangement.

20. In a bowling pin setting machine for use with a bowling alley having a pit at one end thereof and a pin supporting bed, a traveling support, means for moving said support between a pin receiving and a pin delivery position, a rotatable table mounted on said support, a plurality of circularly arranged pin receiving and holding cups carried by said table, means for delivering pins in succession to said cups, means for imparting step by step rotation to said table to move empty cups into the range of operation of said pin delivering means for delivery of pins to said cups, means associated with each of said cups for controlling the stepwise movement of said table, mechanism connected to said elements and responsive to the movement of said support to said pin delivery position for moving said cups from circular arrangement into triangular playing arrangement, pin setting mechanism mounted above said bed at said delivery position, and means for effecting delivery of said pins in said cups to said mechanism.

21. In a bowling pin setting machine for use with a bowling alley, a movable device having a plurality of aligned elements for receiving and holding pins, pin feeding mechanism, mechanism for moving said device to present each of said elements in succession to said feeding mechanism for delivery of a pin handle end upright thereinto, control devices associated with each of said elements controlling the operation of said last-named mechanism, means for incapacitating said control devices when each of said elements holds a pin, means for moving said device and loaded pin holding elements out of the range of said pin feeding mechanism and into a predetermined position over said alley, and mechanism connected to said elements for moving said elements selectively into and out of said aligned arrangement.

22. In a bowling pin setting machine for use with a bowling alley, a movable device having a plurality of pin holding elements, pin feeding mechanism, mechanism for moving said device into the range of operation of said feeding mechanism to present each of said elements to said feeding mechanism for delivery of an upright pin thereinto, control devices associated with each of said elements including, an electric circuit connected with said control devices, and contacts engaged by each pin arriving in one of said elements for operating said last-named mechanism for advancing an empty element to said feeding mechanism, and means for incapacitating said control devices when all of said elements contain upright pins.

23. In a bowling pin setting machine for use with a bowling alley having a pin supporting bed and a pit at one end thereof, a pin setter, pin feeding mechanism for conveying and delivering pins from said pit, a plurality of pin receiving and delivery elements constructed and arranged to support pins handle end upright, means for moving said elements from a position adjacent said mechanism to a position above said bed and beneath said setter, and selectively operated control mechanism operative as the result of the throwing of the first ball of the frame or the throwing of the second ball for setting said means into operation.

24. In a bowling pin setting machine for use with a bowling alley having a pin supporting bed and a pit at one end thereof, a pin setter mounted above said bed, a pin feeding device, mechanism for removing pins from said pit and delivering them to said device, a plurality of pin receiving cups movable to and from a position adjacent said device, means for effecting delivery of pins from said device to said cups and positioning said pins upright in said cups, means for moving said cups out of the range of operation of said device and positioning the same in substantially triangular formation above said alley bed, means for transferring pins from said cups to said setter, and means carried by said setter and actuated by a bowling pin standing on said bed controlling the operation of said setter.

25. In a bowling pin setting machine for use with a bowling alley having a pin supporting bed and a pit at one end thereof, a pin feeding device, mechanism for removing pins from said pit and delivering them to said device, a pin collector, means mounting said collector for movement from a pin receiving position adjacent said device to a pin delivery above said bed, a plurality of aligned pin receiving and holding elements on said collector constructed and arranged to hold pins in upright position, means for effecting delivery of upright pins from said device to each of said cups, a pin setter, means for moving said collector and loaded cups out of the range of operation of said device and positioning said cups in substantially triangular formation beneath said pin setter, means for effecting relative movement between said pins and setter to deliver said pins to said setter, means for returning said collector and empty cups to pin receiving position adjacent said device, and means for moving said setter to place said pins on said bed.

26. A bowling pin setting machine for use with a bowling alley comprising, a device for assembling a plurality of bowling pins handle end upright, a traveling support for traveling upright pins to a pin delivery position, including a plurality of movable elements mounted on said support, and means for arranging said elements in substantially triangular formation above said alley, a pin setter having a plurality of pin holding and setting units, means for effecting relative movement between said elements and said pin setter to effect the delivery of pins in said elements to said holding units, means for moving said setter to deposit said upright pins on said alley, and means operative after the throwing of a ball to reset any pins remaining standing after the throwing of said ball.

27. A bowling pin setting machine for use with a bowling alley comprising a device for assembling a plurality of bowling pins handle end upright, including a traveling support for conveying upright pins to pin delivery position and a plurality of aligned pin supporting elements on said support, and means for arranging said elements in substantially triangular formation above said alley, a pin setter having a plurality of pin holding and setting units, means for effecting relative movement between said elements and said pin setter to effect the delivery of pins in said elements to said holding units, means for moving said device to deposit said upright pins on said alley, and selective means for controlling the operation of said traveling support to deliver a new set of upright pins to said setter if all pins on said alley are knocked down by the first ball thrown.

28. A bowling pin setting machine for use with a bowling alley comprising a device for assembling a plurality of bowling pins handle end upright, including a traveling support for traveling upright pins to pin delivery position and a plurality of selectively movable pin holding elements on said support and means for arranging said elements in substantially triangular formation above said alley, a pin setter having a plurality of pin holding and setting units, means for effecting relative movement between said triangularly positioned elements and said pin setter to effect the delivery of pins in said elements to said holding units, means for moving said setter to deposit said upright pins on said alley, selective mechanism for controlling the movement of said traveling support and pin loaded elements thereon to advance a new set of upright pins to said setter if all pins on said alley are knocked down by the first ball thrown or render said traveling support means inactive to advance a new set of pins until all balls of a frame have been thrown, and means coacting therewith to cause said units to reset on the alley any pins remaining standing after the throwing of the first ball.

29. A bowling pin setting machine for use with a bowling alley comprising a device for assembling a plurality of bowling pins handle end upright, a traveling support for traveling upright pins to pin delivery position including a plurality of selectively movable pin holding elements on said support and means for arranging said elements in substantially triangular formation above said alley, a pin setter having a plurality of pin holding and setting units, means for effecting relative movement between said triangularly positioned elements and said pin setter to effect the delivery of pins in said elements to said holding units, means for moving said setter to deposit said upright pins on said alley, selective mechanism for controlling the movement of said traveling support and pin loaded elements thereon to advance a new set of upright pins to said device if all pins on said alley are knocked down by the first ball thrown or render said traveling support means inactive to advance a new set of pins until all balls of a frame have been thrown, means coacting therewith to cause said units to reset on the alley any pins remaining standing after the throwing of the first ball, said selective mechanism comprising a plurality of electric circuits, means for maintaining one of said circuits energized if all pins are knocked down by the first ball, and means for breaking said last-named circuit and energizing the other of said circuits to cause the resetting of said pins if any pins remain standing after the throwing of the first ball.

30. A bowling pin setting machine for use with a bowling alley comprising a device for assembling a plurality of bowling pins handle end upright, a traveling support for traveling upright pins to pin delivery position including a plurality of selectively movable pin holding elements on said support and means for arranging said elements in substantially triangular formation above said alley, a pin setter having a plurality of pin holding and setting units, means for effecting relative movement between said triangularly positioned elements and said pin setter to effect the delivery of pins in said elements to said holding units, means for moving said setter to deposit said upright pins on said alley, selective mechanism for controlling the movement of said traveling support and pin loaded elements thereon to advance a new set of upright pins to said device if all pins on said alley are knocked down by the first ball thrown or render said traveling support means inactive to advance a new set of pins until all balls of a frame have been thrown, means coacting therewith to cause said units to reset on the alley any pins remaining standing after the throwing of the first ball, said selective mechanism including a plurality of electric circuits connecting each of said units, and pin actuated means on said pin setter and coacting with each of said units for selectively controlling the making or breaking of said circuits.

31. In a bowling pin setting machine for a bowling alley having a pin supporting bed, a pin setter, pin handling units mounted on said setter, a pin conveying mechanism movable from a pin receiving position for delivery of upright pins to said pin handling units, means for moving said setter to deposit pins held by said units on said alley bed, selective mechanism for causing said setter to move to and from said alley bed to cause said units positioned above standing pins to lift any pins remaining standing after a ball has been thrown, and reset said pins on said bed or set a new frame of pins if all pins are knocked down by the first ball thrown.

32. In a bowling pin setting machine for a bowling alley having a pin supporting bed, a pin setter, means mounting said setter above said bed, mechanism for moving said setter to and from said bed to set and reset pins thereon, a pin conveying mechanism for moving pins handle end upright from a pin receiving station to delivery positions beneath said setter, and means for effecting delivery of said pins at said delivery positions to said setter.

33. In a bowling pin setting machine for use with a bowling alley, a pin setter, pin holding units for setting and resetting pins mounted on said setter, a pin conveyor provided with a plurality of holders for conveying pins handle end upright to a delivery station in the range of operation of and beneath said setter for delivery to said setter units, means for effecting relative movement between said setter and said holders for transferring pins from said holders to said units, means for moving said conveyor from said delivery station to receive a new set of pins in said holders, mechanism for moving said setter with said pins in said units to deposit said pins in playing arrangement on said alley, means operative after a ball has been thrown for again moving said setter adjacent said alley for causing said units to lift and reset any pins remaining standing.

34. In a bowling pin setting machine for a bowling alley, a pin setter, pin holding units for setting and resetting pins mounted on said setter, a pin conveyor provided with a plurality of holders for conveying pins handle end upright for delivery to said setter, means for effecting relative movement between said setter and said holders for transferring pins from said holders to said units, means for moving said setter with said pins to deposit said pins in playing arrangement on said alley, and selective means operative in response to the number of pins knocked down by a ball thrown for feeding a new frame of pins or causing said setter-resetter units to reset any pins which remain standing as the result of the ball thrown.

35. In a bowling pin setting machine for a bowling alley, a pin setter table, pin setting and resetting gripper units mounted on said table, means mounting said table for movement to and from said alley, a conveyor device including a plurality of pin holders corresponding in number to that of said units, means for moving said holders containing upright pins from a pin receiving station to a pin delivering station beneath said table and above said alley for delivery of said pins to said units, and means for moving said table downward to cause said units to engage and hold the handle ends of said pins carried upright in said holders.

36. In a bowling pin setting machine for a bowling alley, a pin setter table, pin setting and resetting gripper units mounted on said table, means mounting said table for movement to and from said alley, a conveyor device including a plurality of pin holders corresponding in number to that of said units, and means for moving said holders containing upright pins from a pin receiving station to a pin delivering station beneath said table and above said alley for delivery of said pins to said units.

37. In a bowling pin setting machine for use with a bowling alley comprising a pin assembling station, a pin setter mounted above said alley, a plurality of setter units, means mounting said units in substantially pin playing arrangement thereon, a pin conveyor having a plurality of pin holding elements constructed and arranged to support upright pins, means for moving said conveyor from said station to a delivery position beneath said setter and back to said station, means for locating said elements in positions conforming with those occupied by said units on said setter, means for effecting relative vertical movement between said setter and elements on said conveyor to cause the handle end of said pins in said elements to move into position to be engaged by said units, means for operating said units to grip and hold said handles of said pins, means for separating said setter and pins held therein by said units from said elements, means for returning said elements to pin receiving position, and means for lowering and raising said setter to set and reset said pins on said alley.

38. A bowling pin setting machine for use with a bowling alley comprising a pin assembling station, a pin setter table, a plurality of setter-resetter units mounted on said table in triangular pin playing arrangement, a pin conveyor movable between said pin assembling station above said alley and beneath said table, pin holders on said conveyor for supporting a plurality of pins handle end upright, means for locating said loaded pin holders in substantially triangular positions for delivery of said pins to said units, and means for effecting relative movement between said conveyor and said pin setter table for delivering said upright pins to said setter-resetter units.

39. In a bowling pin setting machine, means for feeding pins to a pin delivery station, a pin conveyor, a plurality of aligned pin receiving and holding elements on said conveyor, means operative at said station for effecting the delivery of handle end upright pins to each of said elements, transfer means for moving said elements from said receiving station and disposing said elements and said upright pins carried thereby in substantially triangular formation, means for engaging the handles of said triangularly positioned pins, and means for removing pins from said triangularly positioned elements and placing them on a bowling alley.

40. Pin setting mechanism for bowling alleys and the like comprising, a spotter for setting and resetting pins on the playing surface of an alley, and electrically operated control means carried by said setter and actuated by engagement with a bowling pin standing on the alley after the throwing of a ball for controlling the operation of said setter.

41. Pin setting mechanism for use with bowling alleys comprising a pin setter, pin setter and resetter units mounted on said setter for movement therewith to and from an alley, a plurality of pin operated electric circuits associated with each of said units, and means operated by a bowling pin standing on said alley after the throwing of a ball and the movement of said setter towards said alley for operating one of said circuits to control the operation of said setter.

42. In a pin setting machine for use with a bowling alley, a pin setter movable towards and from said alley to set and reset pins thereon, a plurality of pin gripping, setting and resetting units carried by said setter and mounted thereon in substantially pin playing position, and a plurality of setter control devices carried by each of said units and operative in response to the presence or absence of a standing pin on said alley after the throwing of the first ball of a frame for controlling the operation of said setter and units thereon to place a new set of pins on said alley or reset a standing pin thereon.

43. Pin setting mechanism for use with bowling alleys comprising a pin setter, pin setter and resetter units mounted on said setter for movement therewith to and from an alley, a plurality of electric circuits associated with each of said units, and a plurality of pin operated circuit control means carried by each of said units and actuated by a bowling pin standing on said alley to control the operation of said setter.

44. In a pin setting machine for use with bowling alleys having a pin supporting bed, a pin setter, a plurality of pin setter-resetter units mounted in substantially pin playing position on said setter, a device movable above said bed from a pin receiving position to a pin delivery station beneath said setter units, said device including a plurality of pin holding elements mounted on said device, and means for moving selected elements on said device for positioning said elements for delivery of pins to said units, control means associated with each of said units, and selective mechanism operated by said control means if a pin remains standing on said bed after the throwing of a ball for preventing movement of said device to said pin delivery station.

45. In a pin setting machine for use with a bowling alley having a pin supporting bed, a pin setter, pin setting and resetting units mounted on said setter in substantially pin playing arrangement, a strike circuit connecting each of said units, a spare circuit also connecting each of said units, mechanism for moving said setter towards said bed after the throwing of a ball, and circuit controlling mechanism operative in response to the presence or absence of standing pins for setting a frame of pins or resetting any standing pins on said alley bed.

46. In a pin setting machine for use with a bowling alley having a pin supporting bed, a pin setter, pin setting and resetting units mounted on said bed in substantial pin playing arrangement, a series circuit connecting each of said units, a parallel circuit also connecting each of said units, mechanism for effecting delivery of a new set of pins to said units if all standing pins of a frame are knocked down by the first ball of a frame thrown, means for moving said setter towards said bed after the first ball is thrown to test for the presence or absence of standing pins, means operated by said series circuit for operating said mechanism to effect the delivery of a new set of pins to said units if all the pins are felled, and means actuated by a bowling pin standing on said bed for operating said parallel circuit to cause said setter to reset said standing pin.

47. Bowling pin setting mechanism for use with a bowling alley having a pin supporting bed constructed and arranged to support a plurality of pins in playing arrangement comprising, a member movable to and from said bed, a plurality of detecting elements movably mounted on said member and positioned to be engaged by any standing pins, and an electric circuit including means responsive to the relative movement of said member and elements for controlling the movements of said member.

48. Bowling pin setting mechanism for use with a bowling alley having a pin supporting bed constructed and arranged to support a plurality of pins in playing arrangement comprising, a member movable to and from said bed, a plurality of detecting elements carried by said member and movable with respect thereto from one position to another by pins standing on said alley bed, and two alternative means controlling operation of said member, one of said means being rendered operative by movement of a detecting element by engagement with a standing pin to one of said positions and the other of said means being rendered operative when all of said elements are in the other of said positions.

49. In a pin setting mechanism for bowling alleys and the like, a spotter movable toward and away from the alley, an electrical control system including two alternative circuits for controlling operation of the spotter, one of said circuits having ten contacts connected in series and the other circuit having ten contacts connected in parallel, and means carried by the spotter and positioned to be actuated by a bowling pin standing on the playing surface of the alley for opening a contact in one of said circuits and closing a contact in the other of said circuits to control the operation of said spotter.

50. In combination with a bowling alley, mechanism movable toward and away from the playing surface of the alley, pin gripping means on said mechanism, a feeler element associated with each of said pin gripping means and positioned to engage and be moved by a pin standing on the playing surface of the alley on movement of said mechanism toward the alley, two alternative electrical circuits controlling operation of said mechanism two electrical contacts, one of which is included in each of said alternative circuits, and means movable by said feeler element to complete one or the other of said alternative circuits in response to the presence or absence of a pin standing on the playing surface of the alley.

51. In a pin setting machine, a pin setter, a plurality of spaced grippers mounted on said setter, each of said grippers including a set of pin gripping jaws, a series circuit associated with each of said grippers, a parallel circuit also associated with each of said grippers, and a pin actuated detector mounted between each of said sets of jaws for controlling the operation of said circuits.

52. In a pin setting machine, a pin setter, a plurality of spaced grippers mounted on said setter frame, each of said grippers including a set of pin gripping jaws, a series circuit associated with each of said grippers, a parallel circuit also associated with each of said grippers, a pin actuated detector mounted between each of said sets of jaws, and means on said detectors for selectively controlling the operation of said circuits.

53. In a pin setting machine, a pin setter, a plurality of spaced grippers mounted on said setter, each of said grippers including a set of pin gripping jaws, a plurality of electric circuits associated with each of said sets of jaws, a pin actuated detector mounted between said sets of jaws for controlling the operation of said circuits, and means normally tending to maintain said detector in inoperative position relative to said circuits.

54. In a pin setting machine, a pin setter, a plurality of spaced grippers mounted on said setter, each of said grippers including a set of pin gripping jaws, a series circuit associated with each of said grippers, a parallel circuit also associated with each of said grippers, mechanism for moving said setters to and from a bowling alley to set and reset pins thereon including means for moving said setter towards said alley after the throwing of a ball, and a detector mounted for coaction with each of said grippers for selectively controlling the operation of said circuits.

55. In a pin setting machine, a pin setter, a plurality of spaced gripper units mounted on said setter and positioned in substantially triangular arrangement thereon, a normally closed circuit and a normally open circuit connecting each of said units, means for lowering said setter towards a bowling alley after the throwing of a ball to determine the presence or absence of standing pins on said alley, and detectors mounted on said setter for cooperation with each of said units for breaking or making one of said circuits to control the operation of said units to cause said setter to set a new frame of pins on said alley or reset any standing pins thereon.

56. In a bowling pin setting machine for use with a bowling alley, a movable device having a plurality of pin holding elements, pin feeding mechanism, mechanism for moving said device into the range of operation of said feeding mechanism to present each of said elements to said feeding mechanism for delivery of an upright pin thereinto, control devices associated with each of said elements including, an electric circuit connected with said elements, and contacts engaged by each pin arriving in one of said elements for operating said last-named mechanism for advancing an empty element to said feeding mechanism, means for incapacitating said control devices when all of said elements contain upright pins, a pin setter positioned above said alley, a plurality of substantially triangularly positioned pin setting-resetting units carried by said setter, control means on said setter operative in response to the number of pins felled by a ball thrown over said alley for effecting movement of said device and pin loaded elements out of the range of operation of said pin feeding mechanism to a delivery position beneath said setter, means for moving said elements into a triangular formation corresponding to that of said units, and means for effecting delivery of said pins to said units.

57. In a bowling pin setting machine for use with a bowling alley having a pin supporting bed and a pit for receiving fallen pins, a pin delivery device, pin receiving mechanism for removing pins from said pit and conveying the same to said device, a pin collector positioned to receive pins from said device, pin holders on said collector constructed and arranged to support pins handle end upright, a pin setting mounted above said alley, means for moving said collector out of the range of operation of said device to position said pin loaded holders beneath said setter for delivery thereto, setter operating mechanism for moving said setter to and from said alley to set and reset pins on said bed, a sweep, means mounting said sweep for movement along said alley, to remove fallen pins therefrom after a ball is thrown, and means for controlling the operation of said setter operating mechanism and means for operating said sweep to effect the proper setting and resetting of pins and the removal of fallen pins.

58. In a pin setting machine for use in setting and resetting bowling pins on the pin supporting bed of a bowling alley, a pin setter movable towards and away from said bed, an electrical control system associated with said setter including a parallel circuit, means carried by said setter and positioned to be actuated by engagement with a bowling pin standing on said bed for closing said circuit to control the operation of said setter in resetting any pin standing on said bed, after the throwing of the first ball of a frame, or delivery of a new set of pins to said bed after the throwing of the allotted number of balls for each frame.

59. In a pin setting machine for use in setting and resetting pins on the pin supporting bed of a bowling alley, a pin setter movable towards and away from said bed, an electrical control system associated with said setter including a normally closed series circuit, means carried by said setter and positioned to be actuated by engagement with a pin standing on said bed after the first ball of a frame is thrown for breaking said circuit to control the operation of said setter to set a new frame of pins on said bed.

LEON W. BATES.